United States Patent
Powell et al.

(10) Patent No.: US 11,671,797 B2
(45) Date of Patent: Jun. 6, 2023

(54) TECHNIQUES FOR RELAYING AUDIO MESSAGES TO DEVICES

(71) Applicant: Apple Inc., Cupertino, CA (US)

(72) Inventors: Richard M. Powell, Mountain View, CA (US); John A. Aguilar, Santa Clara, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 17/238,065

(22) Filed: Apr. 22, 2021

(65) Prior Publication Data

US 2021/0352448 A1 Nov. 11, 2021

Related U.S. Application Data

(60) Provisional application No. 63/022,908, filed on May 11, 2020.

(51) Int. Cl.
*H04W 4/12* (2009.01)
*H04M 3/533* (2006.01)

(52) U.S. Cl.
CPC ......... *H04W 4/12* (2013.01); *H04M 3/53391* (2013.01); *H04M 2201/41* (2013.01)

(58) Field of Classification Search
CPC ........ H04W 4/06; H04W 4/12; H04L 67/303; H04L 12/1895; H04L 12/2814; H04L 12/1845; H04L 51/10; H04L 67/12; H04M 3/53375; H04M 2203/2044; H04M 2203/4545
See application file for complete search history.

(56) References Cited

U.S. PATENT DOCUMENTS

| | | | |
|---|---|---|---|
| 6,493,434 B1 * | 12/2002 | Desmond | H04M 3/4938 379/201.12 |
| 7,403,599 B2 | 7/2008 | Amin | |
| 7,637,810 B2 * | 12/2009 | Amaitis | G07F 17/3223 463/40 |
| 7,769,364 B2 | 8/2010 | Logan et al. | |

(Continued)

FOREIGN PATENT DOCUMENTS

| | | |
|---|---|---|
| WO | WO 01/41411 A2 | 7/2001 |
| WO | 2018/125717 A1 | 7/2018 |

OTHER PUBLICATIONS

"International Search Report and Opinion," dated Jul. 13, 2021 in International Patent Application No. PCT/US2021/031582. 14 pages.

*Primary Examiner* — Jean A Gelin

(74) *Attorney, Agent, or Firm* — Kilpatrick Townsend & Stockton LLP

(57) ABSTRACT

Techniques are disclosed for transmitting an announcement to one or more devices. In one example, a first device receives a first message that includes an announcement, the announcement associated with a voice that spoke the announcement. The first device may determine the announcement from the first message, and then identify one or more devices for receiving the announcement. The one or more devices may have a particular device type of a plurality of different device types comprising at least a mobile device. The first device may then transmit a second message to the one or more devices for presentation of the announcement by the one or more devices.

19 Claims, 11 Drawing Sheets

(56) References Cited

U.S. PATENT DOCUMENTS

| | | |
|---|---|---|
| 8,203,951 B2 | 6/2012 | Gao et al. |
| 8,953,752 B2 | 2/2015 | Li et al. |
| 9,620,124 B2 * | 4/2017 | Wlodkowski ........ G06F 3/04892 |
| 9,672,717 B1 * | 6/2017 | Slavin .................... G08B 21/18 |
| 9,883,001 B2 | 1/2018 | Verna et al. |
| 2009/0094547 A1 * | 4/2009 | Chin .................. H04M 3/42059 |
| | | 707/999.005 |
| 2014/0162583 A1 * | 6/2014 | Daly .................... H04M 3/5116 |
| | | 455/404.1 |
| 2016/0205261 A1 * | 7/2016 | Li ....................... H04M 7/0072 |
| | | 379/88.17 |
| 2017/0245125 A1 | 8/2017 | Child et al. |
| 2019/0230482 A1 * | 7/2019 | Chavez .................. H04W 4/12 |
| 2019/0387087 A1 * | 12/2019 | Martino ................ H04L 67/306 |
| 2019/0394319 A1 * | 12/2019 | Martino .............. H04M 1/2757 |
| 2020/0125056 A1 * | 4/2020 | Pognant ............... H04L 67/306 |
| 2020/0380995 A1 * | 12/2020 | Wlodkowski ........... G10L 15/08 |
| 2021/0029235 A1 * | 1/2021 | Martino ................ H04M 1/578 |

\* cited by examiner

```
                                                              ← 700
```

┌─────────────────────────────────────────────────────────────────┐
│ RECEIVING, BY A RESIDENT DEVICE, A FIRST MESSAGE THAT INCLUDES AN│
│ ANNOUNCEMENT, THE FIRST MESSAGE INDICATING A RECIPIENT USER ACCOUNT│
│           FOR RECEIVING THE ANNOUNCEMENT 702                     │
└─────────────────────────────────────────────────────────────────┘
                                │
                                ▼
┌─────────────────────────────────────────────────────────────────┐
│   OBTAINING, BY THE RESIDENT DEVICE, THE ANNOUNCEMENT FROM FIRST │
│                         MESSAGE 704                              │
└─────────────────────────────────────────────────────────────────┘
                                │
                                ▼
┌─────────────────────────────────────────────────────────────────┐
│   OBTAINING, BY THE RESIDENT DEVICE, THE RECIPIENT USER ACCOUNT  │
│   ASSOCIATED WITH THE FIRST MESSAGE, THE RECIPIENT USER ACCOUNT  │
│       ASSOCIATED WITH ONE OR MORE DEVICES 706                    │
└─────────────────────────────────────────────────────────────────┘
                                │
                                ▼
┌─────────────────────────────────────────────────────────────────┐
│ IDENTIFYING, BY THE RESIDENT DEVICE, A PARTICULAR USER DEVICE OF THE ONE│
│  OR MORE DEVICES ASSOCIATED WITH THE RECIPIENT USER ACCOUNT 708  │
└─────────────────────────────────────────────────────────────────┘
                                │
                                ▼
┌─────────────────────────────────────────────────────────────────┐
│  TRANSMITTING, BY THE RESIDENT DEVICE, A SECOND MESSAGE TO THE   │
│ PARTICULAR USER DEVICE FOR PRESENTATION OF THE ANNOUNCEMENT BY THE│
│               PARTICULAR USER DEVICE 710                         │
└─────────────────────────────────────────────────────────────────┘

┌─────────────────────────────────────────────────────────┐
│ RECEIVE, BY A RESIDENT DEVICE ASSOCIATED WITH A HOME    │
│ ENVIRONMENT, A FIRST MESSAGE THAT INCLUDES AN           │
│ ANNOUNCEMENT, THE ANNOUNCEMENT ASSOCIATED WITH A        │
│ VOICE THAT SPOKE THE ANNOUNCEMENT 1102                  │
└─────────────────────────────────────────────────────────┘
                           │
                           ▼
┌─────────────────────────────────────────────────────────┐
│ DETERMINE, BY THE RESIDENT DEVICE, THAT THE VOICE THAT  │
│ SPOKE THE ANNOUNCEMENT IS ASSOCIATED WITH A PARTICULAR  │
│ USER ACCOUNT OF A PARTICULAR USER TYPE OF THE HOME      │
│ ENVIRONMENT 1104                                        │
└─────────────────────────────────────────────────────────┘
                           │
                           ▼
┌─────────────────────────────────────────────────────────┐
│ DETERMINE, BY THE RESIDENT DEVICE, ONE OR MORE          │
│ RECIPIENT USER ACCOUNTS FOR RECEIVING THE ANNOUNCEMENT  │
│ BASED ON THE PARTICULAR USER ACCOUNT OR THE PARTICULAR  │
│ USER TYPE 1106                                          │
└─────────────────────────────────────────────────────────┘
                           │
                           ▼
┌─────────────────────────────────────────────────────────┐
│ DETERMINE, BY THE RESIDENT DEVICE, ONE OR MORE DEVICES  │
│ ASSOCIATED WITH THE HOME ENVIRONMENT THAT WILL RECEIVE  │
│ THE MESSAGE, A DEVICE OF THE ONE OR MORE DEVICES        │
│ SELECTED FOR RECEIVING THE MESSAGE BASED ON A LOCATION  │
│ OF THE DEVICE OR A TYPE OF THE RESPECTIVE RECIPIENT     │
│ USER ACCOUNT OF THE ONE OR MORE RECIPIENT USER          │
│ ACCOUNTS 1108                                           │
└─────────────────────────────────────────────────────────┘
                           │
                           ▼
┌─────────────────────────────────────────────────────────┐
│ TRANSMIT, BY THE RESIDENT DEVICE, A SECOND MESSAGE TO   │
│ THE ONE OR MORE DEVICES FOR PRESENTATION OF THE         │
│ ANNOUNCEMENT, WHEREIN THE DEVICE OF THE ONE OR MORE     │
│ DEVICES PRESENTS THE SECOND MESSAGE BASED ON A          │
│ VERIFICATION OF ONE OR MORE CONDITIONS. 1110            │
└─────────────────────────────────────────────────────────┘
```

FIG. 11

TECHNIQUES FOR RELAYING AUDIO MESSAGES TO DEVICES

CROSS-REFERENCES TO RELATED APPLICATIONS

The present application claims the benefit of and priority to U.S. Provisional Application No. 63/022,908, filed May 11, 2020, entitled "TECHNIQUES FOR RELAYING AUDIO MESSAGES TO DEVICES." The entire contents of which are incorporated herein by reference for all purposes.

BACKGROUND

Techniques exist for transmitting messages between user devices. Consider a scenario in which a first user speaks into a first device (e.g., a mobile phone). The first device records the message, and then transmits that message to a second device (e.g., another mobile phone). The second device may receive the message and then present the message to a user of the second device (e.g., via a mobile phone speaker). However, sometimes a process for transmitting a voice message from a device to one or more other devices may be challenging, for example, when information about some of the recipient devices (e.g., user affiliation, device location, etc.) may be unknown to the sending device.

BRIEF SUMMARY

FIG. 1 is a simplified block diagram of an example system, according to some embodiments;

FIG. 2 is another simplified block diagram illustrating at least some example techniques for transmitting a message to one or more devices for presentation of an announcement, according to some embodiments;

FIG. 3 is another simplified block diagram illustrating a graphical user interface (GUI) of a user device for presenting an announcement, according to some embodiments;

FIG. 4 is another simplified block diagram illustrating at least some example techniques for transmitting a message to a particular user device for presentation of an announcement, according to some embodiments;

FIG. 5 is another simplified block diagram illustrating an example architecture of a system used to transmit a message to one or more devices for presentation of an announcement, according to some embodiments;

FIG. 6 is a simplified flow diagram illustrating an example process for transmitting a message to one or more devices for presentation of an announcement, according to some embodiments;

FIG. 7 is another simplified flow diagram illustrating an example process for transmitting a message to a particular user device, according to some embodiments;

FIG. 8 is another simplified flow diagram illustrating an example process for transmitting a message to one or more devices, according to some embodiments;

FIG. 9 is another simplified flow diagram illustrating an example process for transmitting a message to one or more devices, according to some embodiments;

FIG. 10 is another block diagram illustrating an example process for transmitting a message to one or more devices, according to some embodiments; and FIG. 11 is another simplified flow diagram illustrating an example process for transmitting a message to one or more devices, according to some embodiments.

BRIEF DESCRIPTION OF THE DRAWINGS

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for transmitting a message that includes an announcement to one or more devices for presentation of the announcement. In a first example, consider a setting that corresponds to a home environment of a home. A user (e.g., dad) may want to announce to other members of the family that dinner is ready. Dad may announce, "Dinner is ready," into a device (e.g., a mobile phone), and an audio recording (e.g., an audio file) of the announcement may be transmitted to a resident device (e.g., a hub device) of the home (e.g., a tablet, smart speaker, a smart digital media player configured to control a television (TV), etc.). The resident device may then identify one or more devices associated with the home environment (e.g., associated with members of the family), each device having a particular type (e.g., including a mobile device type). The resident device may then transmit the announcement to the one or more devices for presentation on each device.

Figure 1:
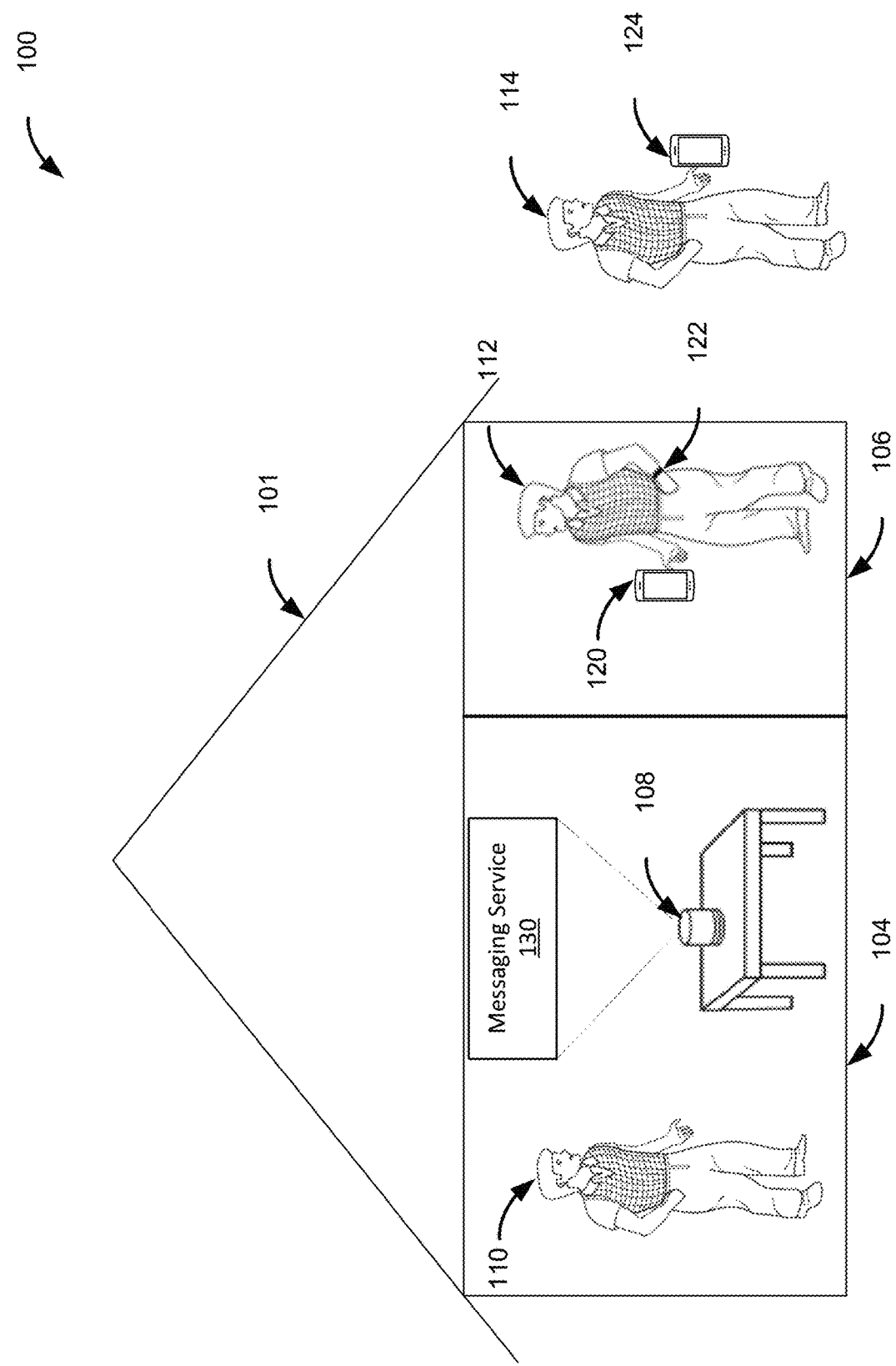

In a second example, dad may want to announce to his son that the son's laundry cycle is finished (e.g., "Son, your laundry is done."). In this example, in addition to announcing the message into the mobile phone, dad may indicate the intended recipient (i.e., dad's son). Dad's mobile device may transmit a message including at least the announcement and the intended recipient to a resident device of the home. The resident device may then identify a particular user device associated with dad's son (e.g., the son's mobile phone), and then transmit the announcement to the son's mobile phone for presentation.

In a third example, dad may want to announce (e.g., via his mobile phone) that he will be home from work soon. In this example, dad's mobile phone may transmit the announcement from outside the home environment (e.g., over a wide area network (WAN)) to the resident device. The resident device may validate that dad's user account type is authorized to utilize the resident device to relay the message to other devices associated with the home environment. Upon validation, the resident device may then generate a message that is formatted (e.g., showing personal identifiable information (PII)) based in part on dad's user account type (e.g., an administrator, instead of being a shared user), and then relay the message to the other devices associated with the home environment. In at least this way, the resident device may ensure a greater level of both privacy and security when relaying announcements to one or more devices associated with a home environment.

In a fourth example, a babysitter of the household wants to relay a message to appropriate users of the home environment that the baby has been put to sleep. Upon the babysitter voicing the announcement, a resident device of the home environment determines, based on determining an identity of the babysitter, that the announcement is intended for select members of the home environment (e.g., mom and dad, but not the housekeeper, etc.). The resident device identifies one or more devices associated with mom and dad, and then transmits the announcement to those devices. The one or more devices, respectively, determine whether to present the announcement (e.g., or to suppress presentation) based in part on verification of one or more conditions (e.g., a proximity of a device relative to another device, a present location of the device, a time of day, a particular activity presently associated with the device (e.g., and/or the associated recipient user account)), etc.

In an illustrative example that corresponds to the first example above, consider a setting that corresponds to a home environment of a home. The home environment may include one or more controller devices, which may be resident devices of the home (e.g., a smart speaker, a smart digital media player configured to control a television (TV), a mobile phone, etc.). A resident device may perform one or more tasks (e.g., relaying announcements to users of the home environment on behalf of a user, announcing reminders, accessing the Internet, controlling accessories, etc.).

The home environment may be associated with one or more user profiles (e.g., user account profiles) of users affiliated with the home environment. In some embodiments, the user profiles may be stored and maintained by at least one resident device of the home environment. Each user account may be associated with one or more personal devices (also known as "user devices"). In a simplified example illustrating a home context for a particular family, a mom, dad, son, daughter, and babysitter may each have a different user profile. Even though the babysitter may not be a member of the family per se, the babysitter may still be affiliated with the home environment, and may participate as a "shared user," described further below. In one non-limiting example, mom's user profile may be associated with a personal device such as a smartwatch, dad's user profile may be associated with another personal device (e.g., dad's mobile phone), son's user profile may be associated with the son's mobile phone and the son's smartwatch, and so forth. In some embodiments, a user profile may also be associated with one or more resident devices. In one example, dad's user profile may be associated with a resident device (e.g., a smart speaker) in dad's home office. In another example, all of the user profiles of the home environment may be associated with a common resident device that is in a common area (e.g., zone) of the home environment (e.g., a smart speaker in the living room of the home).

In some embodiments, there may be different types of user profiles for users, including, for example, an owner profile, an administrator profile, a shared user profile, etc. In some embodiments, the different types of profiles may, respectively, be associated with different features, access rights for sending/receiving announcements, and/or privacy controls. For example, in some embodiments, owner profile types and/or administrator profile types may be able to access data indicating what other user profiles and/or associated user devices are associated with the home environment. In this example, a user device (e.g., a mobile device) associated with an administrator account profile may also have more access rights for sending and/or receiving messages to/from devices associated with the home environment. For example, the user device may be able to send announcements to the devices of the home environment from any suitable location, including outside the home environment (e.g., via a Wide Area Network (WAN), such as the Internet). Likewise, the administrator's user device may be enabled to receive and/or present announcement messages of the home environment at any suitable location. In some embodiments, an announcement associated with an administrator profile may be formatted to include personal identifiable information (PII) (e.g., an facial image, the name) of the corresponding administrator user, for example, to identify the identity of the administrator that is making the announcement.

In another example, users with a shared user profile type may be associated with a different set of access rights and/or privacy controls. For example, shared users may be able to send messages to other devices associated with the home environment, but may not be able to access details of individual user profiles and/or user devices associated with the home environment. In this example, a resident device of the home may not relay announcements to a user device (e.g., a smartwatch) associated with a shared user account when the user device is outside a local area network (LAN) associated with the home environment. Also, in this example, the resident device may also not relay messages received from the user device to other devices of the home environment when the user device is outside the home environment (e.g., when the message is received from outside the LAN, for example, via a WAN). In some embodiments, an announcement associated with a shared user account profile (e.g., including a guest user) may be formatted to not include PII of the guest user. Using the home context described above for illustration, in one example, mom and dad may, respectively, have administrator (or owner) profiles, while the son, daughter, and babysitter may have shared user profiles. It should be understood that any suitable combination of associations between user profiles (and/or user profile types) and devices may be used to perform embodiments described herein. It should also be understood that any suitable access controls and/or privacy controls may be applied to different user accounts and/or account types. For example, an administrator account type may be configured to not include PII of the particular user when utilizing the resident device to relay an announcement to other devices of the home environment.

Continuing with the first illustration above, a user may voice an announcement to a device. For example, a user may speak into a microphone of his mobile phone, "Announce to the home that dinner is ready." In this example, the announcement ("Dinner is ready") may correspond to an element (e.g., a portion) of the audio recording (e.g., which may record the entire spoken message). In some embodiments, the mobile phone may then transmit a recording that includes the announcement to another device for further processing. For example, the mobile phone may transmit the recording to a resident device of the home environment (e.g., a smart speaker in the kitchen). The resident device may then determine (e.g., obtain) the announcement from the recording. For example, the resident device may perform natural language processing (NLP) on the recording ("Announce to the home that dinner is ready") to determine that the announcement corresponds to a subset of words including, "Dinner is ready." In some embodiments, the resident device may transmit the recording to another device (e.g., a server device) to analyze the recording. For example, the server device may perform NLP to determine a start point and an end point of the announcement within the recording. The server device may then transmit splicing data including an indication of the start point and the end point back to the resident device. The resident device may then splice the recording according to the splicing data, and then proceed with further processing of the announcement, as described further herein. In some embodiments, the device that receives and records a voice recording including the announcement may correspond to any suitable device. For example, a resident device of the home environment (e.g., a smart speaker in the kitchen) may directly receive and record the announcement. In this example, the smart speaker may itself process the recording (e.g., splicing the announcement from the recording), without transmitting the recording to another device (e.g., another resident device and/or server device) for further processing. In yet another example, a personal device (e.g., dad's mobile phone) may be used to process the recording. It should be understood that one or more devices, and/or combinations thereof may be used to process the recording. It should also be understood that the device that receives, records, and/or processes the recording may be located at any suitable location (e.g., inside or outside the home environment). For example, using the illustration above, dad may have left the home environment and be at another location (e.g., an office building), and may have forgotten to notify household members that dinner is ready. Upon remembering, dad may announce to his phone that dinner is ready. In this example, dad's personal device, a resident device of the home environment, a server device in the cloud, and/or any suitable combination thereof may be used to process (e.g., analyze) the recording to obtain the announcement.

Upon processing the recording to obtain the announcement, a device associated with the home environment may then identify one or more devices for receiving the announcement. For example, continuing with the first illustration above, a resident device of the home environment (e.g., the smart speaker in the kitchen) may receive the recording from dad's mobile phone and then splice the recording to obtain the announcement. In some embodiments, the resident device may then retrieve a list of devices for receiving the announcement. For example, as described above, the resident device may store in a database a list of user profiles associated with the home environment. In some embodiments, the list of user profiles may also (and/or alternatively) be stored in the cloud (e.g., on a server device) and then retrieved by the resident device. Based on the list of retrieved user profiles associated with the home environment, the resident device may then identify the one or more other devices for receiving the announcement. It should be understood that the resident device (and/or server device) may have access rights to access data for each of the user profiles and/or devices (e.g., other resident devices and/or personal devices) associated with the home environment. For example, using the illustrative above, the resident device may determine that mom's user profile is associated with mom's smartwatch, dad's user profile is associated with dad's mobile phone and another resident device (e.g., in dad's home office), son's user profile is associated with the son's mobile phone and the son's smartwatch, etc. The resident device may also identify other resident devices associated with the home environment that are affiliated within multiple users (e.g., located in a common area of the home). In some embodiments, each of these devices may have different types. For example, some of these devices may be personal devices, including devices that are mobile device types (e.g., a mobile phone, tablet, smartwatch, and/or other wearable devices). In another example, some devices may be a resident device type (e.g., the smart speaker in dad's home office). In one example, the resident device may identify all of these devices for receiving the announcement that dinner is ready. In another example, a subset of the devices may be identified for receiving the announcement (e.g., a subset that excludes personal devices associated with dad (the announcer), a subset that excludes devices not currently present within the home environment, etc.).

It should be understood that each of these devices may reside in the same location or different locations. For example, mom's smartwatch may currently be located at a gym, the son's mobile phone and smartwatch may be located at school, a mobile phone of the babysitter may be located in the family room of the home, a mobile phone of the daughter may also be located within the family room of the home, etc. In some embodiments, the home environment may also be divided into different zones. For example, the family room may correspond to one zone, the kitchen may correspond to another zone, dad's home office may correspond to yet another zone, etc. In some embodiments, a zone may be associated with one or more resident devices (e.g., the smart speaker in dad's home office).

Continuing with the example above, the resident device that identified the recipient devices (e.g., the smart speaker in the kitchen) may then transmit a message that includes the announcement (e.g., including the spliced audio recording) to the identified one or more devices. For example, consider a case in which at least some of the devices are within the home environment (e.g., the babysitter and daughter's mobile phones within the family room, the smart speaker within the living room, etc.). In some embodiments, the resident device may transmit the message to these devices over a local area network (LAN) of the home environment. For example, the resident device may be connected to the LAN via a router (e.g., an edge router), and may transmit the message to these devices within the home environment over the LAN via a WiFi connection. As described herein, it should be understood that a LAN may describe any suitable computer network that interconnects electronic devices within a limited area (e.g., a home environment). Accordingly, other suitable network protocols (e.g., Bluetooth, Thread, ZigBee, etc.) may be utilized within the context of a LAN, for example, allowing a user device (e.g., a mobile phone) to communicate directly with the smart speaker (and/or vice versa) and without necessarily using TCP/IP as is used with WiFi in a "traditional" LAN configuration. In another example, at least some of the devices may be located outside the home environment (e.g., mom's smartwatch at the gym, the son's mobile phone and smartwatch at school, etc.). In this example, the resident device may also be connected to a wide area network (WAN) (e.g., the Internet) via the router. The resident device may transmit the message to these devices over the WAN (e.g., via a server device associated with the resident device).

In some embodiments, as described above, the resident device may determine a subset of devices and/or user accounts associated with the home environment for receiving the message. For example, in some embodiments, the resident device may determine a particular user type (e.g., an administrator type or shared user type) of a particular user account (e.g., a recipient user account) of the home environment. The resident device may also determine devices (e.g., user devices) associated with the particular user account. If the particular user type is not authorized to receive messages while outside the home environment (e.g., outside the LAN), then the resident device may determine if any of the devices associated with the particular user account are inside the LAN. The resident device may then relay the message to only those devices inside the LAN. If the particular user type is authorized to receive messages while outside the home environment, then the resident device may relay the message to a larger set (e.g., all) of the associated user devices of the particular user account. In some embodiments, for a given user account, the resident device may send the message to a subset of devices associated with the user account, based on one or more determined conditions (e.g., a proximity to the resident device or other user devices, a location of a device, a time of day, an present activity currently associated with the user account, etc.). In some embodiments, the resident device may send the message to all devices associated with the user account (e.g., independent of conditions), and one or more recipient devices may determine to suppress the presentation of the message based on determining one or more conditions, as described further herein.

In another example of determining which recipient user accounts and/or recipient devices in which to transmit the message, the resident device may determine this list based in part on determining the particular user type of the sender and/or an identity of the sender user account. For example, the resident device may be configured to store a list of rules corresponding to a list of recipients (e.g., including recipient devices), depending on a particular sender account (and/or account type). In one example, the resident device may determine an identity of the sender based on voice recognition, as described herein. The resident device may determine that the identity of the sender is associated with an administrator account type (e.g., dad's account). In this example, the resident device may then relay the messages to a certain set of devices (e.g., all devices) of the home environment. In another example, the resident device may determine that the voice corresponds to the babysitter's shared user account, and may accordingly relay the messages to a subset of user accounts and/or devices (e.g., only devices associated with mom and dad). It should be understood that any suitable rules may be utilized to determine which user accounts and/or devices to route the message, for example, based on a sender's determined identity and/or account type.

Continuing with the illustration above, upon each identified device receiving the message from the resident device, the respective device may present the announcement on the device. In some embodiments, a form of the presentation of the announcement may be based on the respective particular device type. In one example, using the illustrative above, where the device may be the resident device in the living room, the form of the announcement may be an audio announcement (e.g., "Dinner is ready."). In another example, where the device may be a smartwatch or mobile device, the device may first present a notification (e.g., a banner) that an announcement has been sent to the home. Upon the user clicking on the notification, the device may output the audio announcement. In some embodiments, the audio announcement may also be presented alongside a text-based announcement (e.g., a text transcription of the audio). In some embodiments, for example, depending on privacy control settings, an image may also be presented (e.g., an avatar and/or icon identifying the sender). In some embodiments, there may be no identification of the specific sender, and instead the recipient may notified that there is an announcement from a user of the home environment. In some embodiments, as described further herein, the sender may (or may not) be identified based on part on the type of user profile associated with the sender (e.g., administrator, owner, shared user). In yet another example, the audio recording may also be included within an audiovisual recording that is transmitted and presented on one or more of the devices. For example, in the case where a recipient device is a resident device of the home that is a smart digital media player configured to control a television (TV), the resident device may present the announcement via both audio and video (and/or text). In this example, the sender may have also recorded the announcement using a device equipped for audiovisual recording. It should be understood that any suitable method may be used to present an announcement.

As described further herein, a recipient device that receives a message (e.g., relayed from a resident device of the home environment) may subsequently determine whether to present or suppress the message, for example, based on determining on or more conditions. In one example, the recipient device may determine a condition corresponding to whether one or more devices (e.g., user devices and/or resident devices) are proximate to the recipient device. If so, then the recipient device may determine (e.g., based on a rule(s)), whether to present the message or not. For example, the recipient device (e.g., a smartwatch) may determine that another proximate device (e.g., a mobile phone of the user) has high priority to present the message (e.g., via a notification). It should be understood that, although a message notification may not be displayed, the message (e.g., the announcement and/or associated metadata) may be stored on the device. In another example, the recipient device may determine another condition corresponding to a particular type of activity associated with the recipient user account (e.g., sleeping, jogging, working, driving, etc.). Based on the type of activity, the device may determine whether to present or suppress the message. For example, in a case where the activity is sleeping, the user device infer a "Do-Not-Disturb" indication, and thus, may determine to suppress the message. It should be understood that any suitable one or more conditions (e.g., a relative device location with respect to the user and/or the home environment, user device preferences, etc.) may be used to determine whether to present or suppress a relayed message (e.g., an announcement) relayed from the resident device.

As described further herein, conditions for determining by the resident device which one or more devices to relay a reply (e.g., response) message (e.g., a reply to the original announcement) may also be applicable. For example, the resident device may determine to only relay the reply message to the device that originally sent the message. In another example, the reply message may be transmitted to multiple devices. Correspondingly, a device that receives a response message may also utilize one or more conditions to determine whether to present and/or suppress a message relayed from the resident device that is a response to an announcement.

In a second illustrative example, consider a scenario in which dad intends to transmit an announcement to a particular user that is associated with the home environment. For example, using an earlier example above, suppose dad wants to announce to his son that the son's laundry cycle is finished, so that the son may remove the clothes from the laundry room. In this example, similar to as described above, dad may voice an announcement into his mobile phone (e.g., "Son, your laundry is done."). Dad's mobile phone may record the announcement and then transmit the recording via a message to a resident device of the home (e.g., the smart speaker in the kitchen). In this case, the recording may also indicated the intended recipient (e.g., dad's son), which may be used to identify the recipient from the recording. In some embodiments, the device (e.g., dad's mobile phone) that receives and records the recording including the announcement may also receive additional types of input regarding an intended destination and/or intended recipients for the message. For example, dad's mobile phone may receive input corresponding to a particular zone of the home. For example, suppose that dad knows that his son is currently in the son's bedroom (e.g., a zone of the home environment), which includes another resident device. Dad may select the son's bedroom as an intended destination, which may be transmitted by dad's mobile phone to a resident device along with the recording of the announcement. In another example, dad may not know exactly who's laundry is in the laundry room, but may know that it belongs to one of a subset of people affiliated with the home environment (e.g., not including the babysitter). In this example, dad may select the subset of people for receiving the announcement.

Continuing with the example above, in which dad wants to announce to his son that the laundry is done, the resident device (e.g., the smart speaker in the kitchen) may first obtain the announcement from the recording (e.g., similar to as described herein). The resident device may then identify a particular user device(s) of one or more devices associated with the son (e.g., the son's mobile phone) for receiving the announcement, according to any suitable criteria. For example, as described earlier, the resident device may retrieve a user profile of the son, and determine devices associated with the son (e.g., the smartwatch and the mobile phone). In some embodiments, the resident device may select a particular user device of the devices associated with the son (e.g., based on a predefined priority order). For example, the resident device may select the son's mobile device instead of the son's smartwatch for transmitting the message (or vice versa), based on a heuristic-based likelihood of the son seeing the message. In another example, the resident device may select both (e.g., all) of the devices associated with the son for receiving the message.

In some embodiments, the resident device (e.g., the smart speaker in the kitchen) may select the particular user device for receiving the message based on a determined location of one or more devices associated with the user. For example, using the illustration above, the resident device may receive location data (e.g., including Global Positioning System (GPS) coordinates) from each of the user devices associated with the son (e.g., the smartwatch and the mobile phone). Upon determining that both devices are proximate to each other (e.g., in close proximity), the resident device may determine to select the son's mobile phone instead of the smart watch for transmitting the message. In another example, consider a case in which dad selects the son's bedroom for receiving the message. In this example, the son's bedroom may also have a resident device (e.g., a tablet). In this example, the smart speaker in the kitchen may receive GPS coordinates from both the tablet in the son's bedroom and the son's user devices. Upon determining that all three devices (e.g., the tablet, the mobile phone, and the smartwatch) are likely in the same bedroom (e.g., the same zone), the resident device may determine to select only one (or a subset) of the devices for receiving the message. In some embodiments, the resident device may determine the particular user device for receiving the message based in part on whether the user device is within or outside the home environment, the type of user profile, and/or other suitable factors, as described herein. In some embodiments, and, similar to an earlier example, the resident device may transmit the message via a particular network path, depending on the location of the particular recipient user device. For example, in a case in which the son is at school (e.g., with his mobile device and smartwatch), the resident device may transmit the message (including the announcement recording) over the WAN (e.g., via a server device) to the particular user device (e.g., the son's mobile phone). In another case, in which the particular recipient user device is within the home environment, the resident device may transmit the message over the LAN associated with the home environment. Upon receiving the message, the recipient user device may present the announcement.

In some embodiments, utilizing the second example above, the resident device may select a plurality of devices (e.g., all devices) associated with the son's user account for receiving the message. In this case, the plurality of devices may, respectively, upon receiving the message from the resident device, determine whether to suppress or present the message from being displayed. For example, suppose that in the second example, the resident device transmits the message to the tablet (e.g., the resident device), the mobile phone, and the smartwatch in the son's bedroom. In this example, the mobile phone and the smartwatch may each determine that they are presently located within the son's bedroom, in which the resident device also exists. They may also determine (e.g., based on activity detected via the smartwatch and/or mobile phone), that the son is likely in the bedroom. In this case, the mobile phone and smartwatch may store the message upon receipt, but suppress presentation of the message. Meanwhile, the resident device in the bedroom may present the message via a speaker connected to the tablet. In some embodiments, similar to as described herein, each device may determine how to process a message based in part on verifying if one or more conditions exist.

Also, similar to as described above with respect to the first illustration, in some embodiments, a form (e.g., and/or format) of the presentation of the announcement may be based on any suitable factor, including, but not limited to, the respective particular recipient device type, the identity of the recipient user account, the sender user account type, the sending device type, etc. Also, as described herein, a recipient device may determine whether and/or how to present a message based on one or more settings of the recipient device. For example, using the example above, suppose that the resident device transmits a message to the son's mobile phone. However, in one example, the son's mobile phone is away from the home environment (e.g., at school). In this example, the son's mobile phone is configured to ignore messages received from a resident device of the home environment when the phone is away from the home environment. In this case, even though the mobile phone may receive (and/or detect) the message from the resident device, the mobile phone may not present (e.g., may suppress) the announcement. Any suitable settings of recipient devices may be used to perform embodiments of the present disclosure. In some embodiments, a recipient device may be enabled to reply to an announcement. For example, the reply may correspond to transmitting a message back to the original sender device for presentation on that device (e.g., dad's mobile phone and/or the smart speaker in the kitchen).

The embodiments of the present disclosure provide several technical advantages over existing systems. In one example, embodiments of the present disclosure provide techniques for efficiently transmitting an announcement to one or more devices that are each associated with a home environment. For example, some conventional systems may enable a user device to transmit a message for announcement on a resident device (e.g., a smart speaker) within a home environment. However, embodiments for the present disclosure enable a device to transmit a message for announcement on a variety of devices, which may be of different types (e.g., including a mobile device type, a resident device type, etc.). Additionally, the sending and/or receiving devices may each be in different locations (e.g., within the home environment, outside the home environment, and/or any suitable combination thereof). Also, embodiments for the present disclosure enable the sending device to send a message to one or more devices (e.g., associated with one or more user profiles) even though the sending device may not have access to data about the recipient devices. For example, the sending device may be associated with a shared user profile (e.g., as described above) that does not have access to data about other user profiles and/or other user devices. In this case, the sending device may still be able to transmit an announcement for presentation on the other devices, based on using the resident device as a relay device to transmit the announcement to the other devices. In at least these ways, embodiments of the present disclosure provide a more efficient mechanism for transmitting announcements. For example, a user device (e.g., a mobile phone, smartwatch, etc.)) may require less battery power and/or other computing resources to transmit an announcement, at least because a resident device of the home environment acts as a relay device for the user device (e.g., obtaining the announcement, determining the recipient user devices, transmitting the message to each device, etc.). When considered over a large number of announcements within a home environment, the savings of computing resources may be significant. In another example, techniques of the present disclosure provide additional privacy and/or security features when transmitting announcements within a home environment. For example, as a privacy feature, and as described above, a user device that is not associated with an administrator (or owner) profile (e.g., and thus, does not have access to other devices affiliated with the home environment) may be prevented from having access to address information of devices of the home environment, while still being enabled to make an announcement to the other devices, whereby the announcement is managed by a resident device of the home environment (e.g., acting as a relay device). Also, as an example security feature, depending on the type of user account (e.g., a shared and/or guest user type), the associated device may be prevented from transmitting messages to the home environment via the resident device while the device is outside the home environment, but may be allowed to transmit the message while the device is within the home environment (e.g., using the LAN of the home environment). Correspondingly, the shared user account type may also (and/or alternatively) be prevented from receiving messages while outside the home environment. As an additional security feature, in some cases, the recipient user account(s) and associated devices may be determined based in part on the identity of the sender account and/or the sender account type. For example, a resident device may be configured to automatically relay messages from particular account type (e.g., shared user type) to a subset of user accounts (and/or associated devices) of the home environment.

In another example of a technical advantage, techniques of the present disclosure may improve a user experience by enabling a user device to transmit an announcement to a particular user device associated with an intended recipient. For example, using an earlier example, dad may want to announce to his son that the laundry is done. Instead of a message being sent to every device associated with the home environment, a targeted message may be sent only to a device associated with the son. In some embodiments, this may reduce the number of messages transmitted, which may produce significant aggregate reductions in network traffic over a large number of announcements. Additionally, techniques of the present disclosure enable the system to selectively transmit an announcement to a device for presentation based on the location of the device relative to other devices. For example, using the illustration above, if the son's mobile device is present along with another device (e.g., a resident device, or another user device) within the same zone of the home environment (e.g., the son's bedroom), the system may transmit an announcement only to a particular device for presentation (e.g., the resident device instead of the mobile device, or vice versa). This may improve the user experience by reducing the potential for the user to feel overwhelmed with message notifications.

In yet another example of a technical advantage, techniques described herein enable a better user experience based in part on sending and/or recipient devices presenting a message based in part on verification of one or more conditions. For example, a recipient device may present a message depending in part upon whether other devices are in close proximity. If so, then the recipient device may suppress the message. In another non-limiting example, a recipient device may suppress presentation of a message if the device determines that the user is currently engaged in a particular activity (e.g., sleeping). Accordingly, techniques described enable determination of an optimal device (e.g., a resident device and/or user device) of a home environment to present messages to a user in a timely manner that also does not overwhelm the user with messages.

For clarity of illustration, it should be understood that, although techniques of the present disclosure are primarily directed to transmitting a message to one or more devices for presentation of an announcement within the context of a home environment, embodiments should not be construed to be so limited. For example, embodiments may be performed in other suitable contexts (e.g., a school building, an office building, a gym, etc.). Also, it should be understood that any suitable device may be suitable for performing embodiments described herein. For example, some embodiments herein are directed primarily to a resident device of the home environment identifying one or more user devices (or a particular user device) for transmitting an announcement. However, a server device (e.g., in the cloud) may also be used to perform one or more operations of these embodiments. In another example, a user device (e.g., a mobile phone or tablet that is associated with an administrator or owner profile) may also perform one or more operations of these embodiments described herein (e.g., identifying one or more user devices for receiving the announcement, transmitting the announcement message, etc.), which may otherwise typically be performed by a resident device and/or server device.

FIG. 1 is a simplified block diagram 100 that illustrates an example environment, according to some embodiments. In FIG. 1, the example environment depicted includes a home environment 101. The home environment 101 may correspond to a defined (e.g., limited) area and/or structure (e.g., dwelling unit), whereby one or more user profiles (e.g., of family members, roommates, etc.) have some affiliation with the home environment 101. Each user profile that is affiliated with the home environment 101 may also be affiliated with one or more devices (e.g., a smart watch, mobile phone, tablet, etc.). For example, in FIG. 1, user 112 may represent an affiliated user who has a user profile that is associated with user device 120 (e.g., a mobile phone) and also associated with another user device 122 (e.g., a smartwatch). User 112 is depicted in FIG. 1 as being within a particular zone 106 of the home environment 101 (e.g., signified by the dividing vertical line within the home space). In one example, a zone may correspond to a room or other suitable partition (e.g., a living room, kitchen, bedroom, office, etc.).

In some cases, a user profile that is affiliated with the home environment may be associated with a user device that is presently located outside the home environment. For example, in FIG. 1, user 114 may represent an affiliated user who has a user profile that is associated with user device 124, and whereby user device 124 is presently outside the home environment 101 (e.g., at school, at the office, etc.).

Within the home environment 101 may be one or more controller devices, which may typically operate as resident devices within the home environment 101 (e.g., a tablet, a smart home controller, a smart digital media player, a home automation device, or the like). In some embodiments, each resident device in a home environment may be configured to perform techniques of the present disclosure. In some embodiments, the one or more resident devices may perform operations to synchronize (e.g., and/or coordinate operations) with each other. For example, a particular resident device of the home environment may be selected among other resident devices to perform embodiments described herein. In this example, other resident devices (e.g., in different zones of the home environment 101) may route messages to the selected resident device for performing these operations (e.g., identifying recipient devices, and/or relaying the announcement to other devices of the home environment).

In the simplified home environment 101 of FIG. 1, a resident device 108 (e.g., a smart speaker device) is depicted as a representative resident device suitable for performing embodiments described herein. The resident device 108 may be resident within another zone 104 of the home environment 101 that is different from zone 106. In one example, the zone 104 may correspond to a common space within the home environment 101 (e.g., the kitchen, living room, etc.). In this case, as a resident device within a common space, the resident device 108 may be associated with more than one user profile. For example, in a case where zone 104 corresponds to a living room that is common to the home environment 101, the resident device 108 may be associated with all affiliated users (e.g., or a subset of users) of the home environment 101. In this example, a user 110 may be one of the affiliated users of the home environment 101 that is associated with the resident device 108. In some embodiments, a particular resident device may be associated with a particular user profile (e.g., a resident device in a bedroom that is associated with a particular user).

In some embodiments, as described herein, the resident device 108 may be communicatively connected to one or more other devices, each of which are also affiliated with the home environment 101. For example, the resident device 108 may be communicatively connected to one or more personal (e.g., user) devices and/or other resident devices. As described herein, in some embodiments, a user device (e.g., user device 120, which may be a mobile device) or other resident device may be connected to the resident device 108 via a LAN while being within the home environment 101. In some embodiments, a user device (e.g., user device 124, which may be another mobile device) may be connected to the resident device 108 via a WAN while being outside the home environment 101. In some embodiments, the resident device 108 may be connected to a router that is also included within the home environment 101. The router may be communicatively connected (e.g., via a LAN, described herein) to one or more of the devices affiliated with the home environment 101 (e.g., user device 120, resident device 108, etc.). The router may also be connected to one or more external network(s) outside the home environment 101 (e.g., a WAN, such as the Internet). In some embodiments, the router may operate as an edge (e.g., boundary) router that provides connectivity between the LAN (e.g., which is operating in the home environment 101) and the WAN. For example, a server device may be connected to the router via the WAN. In some embodiments, the server device may be associated with (e.g., as a service provider) one or more of the resident devices of the home environment 101 (e.g., resident device 108), and may perform one or more operations described herein. For example, the server device may receive a message from the resident device 108 via the WAN, and then relay the message to a device associated with the home environment 101 that is presently outside the home environment 101. In another example, the server device may route messages to the resident device 108 of the home environment 101 that are received from a device outside the home environment 101 and intended for devices of the home environment 101.

In some embodiments, the resident device 108 may operate a messaging service 130. The messaging service 130 may perform one or more operations that are described by embodiments herein. In one example, the messaging service 130 of resident device 108, may be configured to transmit a message containing an announcement to one or more devices affiliated with the home environment 101. For example, the messaging service 130 may receive a message that includes an announcement. In one example, the resident device may receive and record a voice announcement received from the user 110, who spoke into a microphone of the resident device 108 (e.g., "Announce that dinner is ready."). The resident device 108 may then identify one or more user profiles (e.g., of user accounts) associated with the home environment 101, and corresponding user devices (and/or resident devices) associated with each user profile (e.g., user device 120, user device 122, user device 124). The resident device 108 may then identify at least a portion (e.g., a subset and/or all) of the devices for receiving the announcement, and then transmit a message including the announcement to each of these identified devices. As described above, the message may be transmitted using any suitable network path (e.g., the LAN of the home environment 101 or the external WAN), depending, for example, on the location of the respective recipient device. Upon receiving the message, depending in part on the type and/or configured settings of each recipient device, and/or a verification of one or more conditions (e.g., a location of the recipient device, a proximity to other user devices, a time of day, a present activity, etc.), the respective recipient devices may present (or suppress) the announcement. In another example, the messaging service 130 may be configured to transmit a message including an announcement to a particular user device for presentation. For example, the messaging service 130 may receive a message that includes an announcement. In one example, the user device 120 may receive and record a voice announcement received from user 112, who spoke into a microphone of the user device 120 (e.g., "Tell son that his laundry is done."). In some embodiments, as described above, the user device 120 may transmit a message to the resident device 108 containing a recording including the announcement. In this example, the resident device 108, operating as a relay device, may obtain the announcement from the message, and then identify a particular user device associated with the son for receiving the announcement. For example, if user device 124 corresponds to the son's mobile phone, the resident device may identify user device 124 (e.g., by retrieving the user profile of the son), and then transmit another message including the announcement to the particular user device 124 for presentation to the user 114 (e.g., the son).

Figure 2:
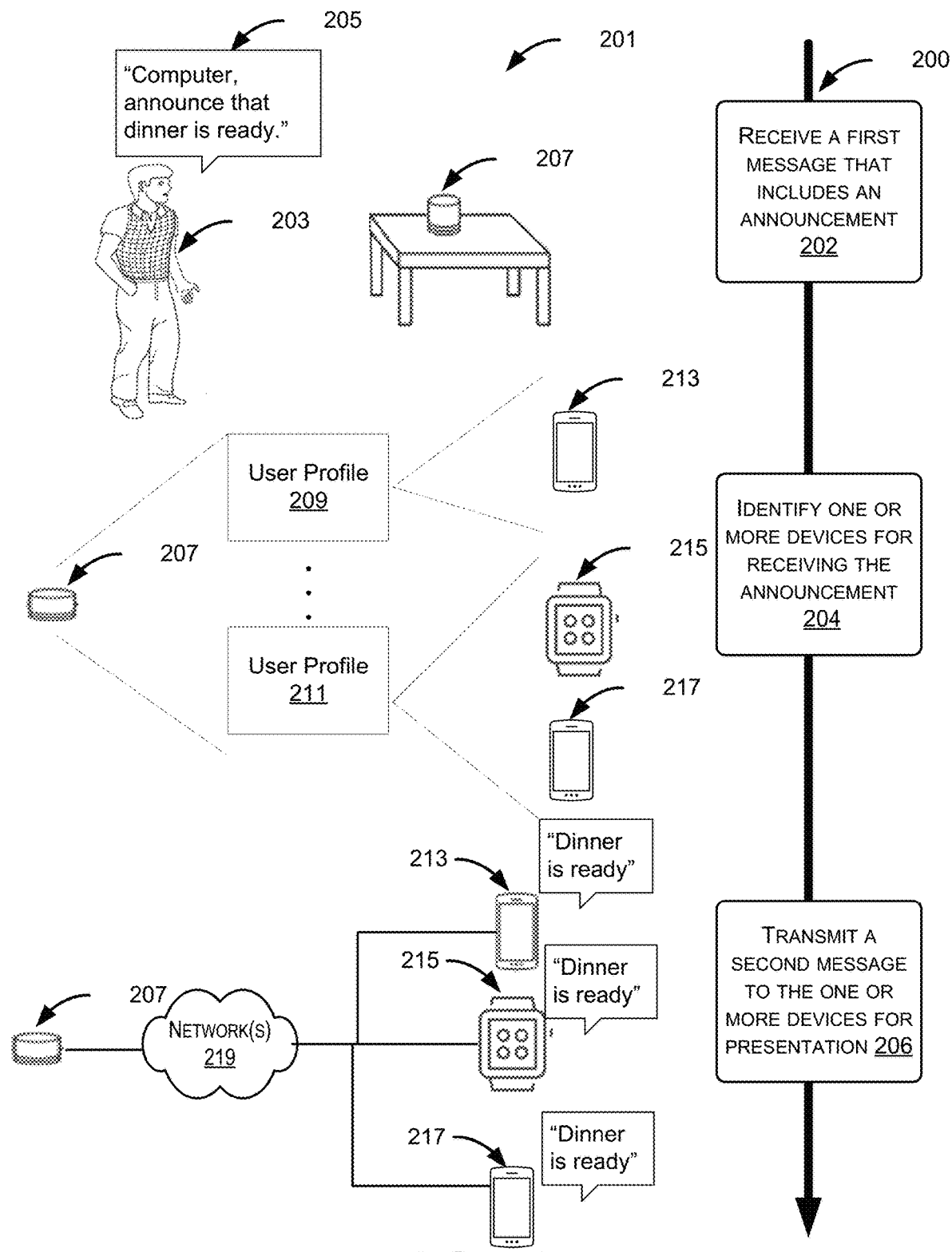

FIG. 2 is another simplified block diagram depicting an example process performed by a system, according to some embodiments of the present disclosure. The process 200 is an example high-level process for a system (e.g., resident device 108 of FIG. 1) that may transmit (e.g., relay) a message including an announcement to one or more devices for presentation of the announcement. The process may be performed within the context of a home environment (and/or devices affiliated with the home environment), which may be similar to the home environment 101 of FIG. 1. The diagram 201 depicts example states that correspond to blocks of the process 200. The diagram 201 may include elements that are similar to those depicted in reference to FIG. 1. For example, a user 203 may correspond to the user 110 of FIG. 1, a resident device 207 may correspond to the resident device 108, a user profile 209 may correspond to the user account profile for user 114 of FIG. 1, a user device 213 (e.g., a mobile phone) may correspond to the user device 124 of user 114, a user account profile 211 may correspond to the user profile for user 112, a user device 215 (e.g., a smartwatch) may correspond to the user device 122 of user 112, and a user device 217 (e.g., a mobile phone) may correspond to the user device 120. Additionally, a voice message 205 may correspond to a voice message that is spoken by the user 203. A network(s) 219 may correspond to one or more networks. For example, the network 219 may include a LAN associated with the home environment. The network 219 may also include a WAN (e.g., the Internet).

As described herein, although the resident device 207 of the home environment is depicted as the system performing the process 200, it should be understood that other suitable devices may perform one or more operations of the process 200. For example, a server device affiliated with the home environment (e.g., connected to the home environment via the WAN) may perform one or more operations of process 200. In one example, the server device may be operated by a cloud service provider, whereby resident devices of the home environment utilize the server device to provide one or more services to devices of the home environment. In another example, a user device (e.g., a tablet or mobile phone) that may have appropriate access rights (e.g., an administrator or owner) may be enabled to perform one or more operations of process 200.

Turning to the process 200 in further detail, at block 202, the system may receive a first message that includes an announcement. For example, using diagram 201 for illustration, the user 203 may wish to announce to other members of home environment that dinner is ready. The user 203 speaks a voice message 205, "Computer, announce that dinner is ready." The system may receive the voice message 205 as input (e.g., corresponding to the first message), for example, via a microphone attached to the system, and then record the voice message 205. The system may then analyze the recorded message to determine (e.g., obtain) the announcement.

In some embodiments, a voice message may contain one or more elements, which may be determined and analyzed (e.g., classified) by the system to obtain the announcement from the first message. In some embodiments, the system may perform NLP on the voice message 205 to obtain the announcement based on a determined classification of one or more elements of the voice message 205. For example, using diagram 201 for illustration, a voice message may contain a trigger element or phrase (e.g., "Computer," "announce"), which corresponds to one or more words that may signal to the system that a user is about to voice a message. The trigger element may also indicate a desired action that the system should perform, upon receiving the message. The voice message may also contain a domain element, which may correspond to one or more words that indicate a domain of the message (e.g., "Food," "Laundry," "Exercise," etc.). In the case where the voice message contains an announcement, the announcement may correspond to one or more words (e.g., a phrase) within the message. Using diagram 201 for illustration, the voice message 205 contains a trigger phrase (e.g., "Computer, announce"), which may signal to the system that an announcement will be subsequently spoken. The voice message 205 also contains an announcement (e.g., "Dinner is ready"), as well as a domain element (e.g., "dinner," indicating that the announcement is about food). In some embodiments, the system may determine the announcement based at least in part on a determined domain and/or sub-domain (e.g., "food," "cooking", etc.). It should be understood that any suitable words and/or phrases may be used by the system to determine one or more elements of the voice message 205. Upon the system determining the announcement, the system may further determine a start point and end point for the announcement within the recording of the voice message 205. In some embodiments, the system may further determine a text transcription of one or more words corresponding to the announcement. In some embodiments, if the original announcement also included a video (e.g., an audiovisual announcement), the start point and end point may further correspond to respective frames of a video. Upon determining the start point and end points for the voice message 205 (e.g., which may be known as splicing data), the system may splice the recording of the voice message 205 to obtain the announcement as a spliced recording (e.g., "Dinner is ready").

As described above, in some embodiments, a voice message may also indicate an intended recipient for the message (e.g., in a case where the message is an announcement). For example, the voice message 205 may alternatively be, "Computer, announce to Bob that dinner is ready," in which case the intended recipient could be determined to be "Bob." In some embodiments, the intended recipient(s) may be inferred and/or subsequently determined by the system (e.g., everyone affiliated with the home environment, everyone currently present within the home, etc.). In some embodiments, the intended recipient may be inferred based at least in part on one or more elements of the message (e.g., a determined domain, sender, etc.). In the example of diagram 201, since the domain is related to "dinner" or "food," it may be inferred that the message is intended for affiliated members of the home environment currently present within the home environment (e.g., available to participate in the dinner meal). In some embodiments, as described further herein (e.g., with reference to FIG. 10), the intended recipient(s) may be determined based on one or more rules. For example, a particular user account (e.g., associated with the announcer, user 203) may be associated with a subset of user accounts of the home environment. In this example, if the voice recorded in the voice message 205 is determined correspond to the user account for user 203, then devices associated with the subset of user accounts may be selected as recipients for the message. It should be understood that the system may be able to determine (e.g., infer) an intended one or more recipients (or any suitable other information) according to any suitable method (e.g., a machine-learning algorithm (e.g., performing NLP) and/or heuristic-based algorithms, etc.).

Similarly, as described further herein (e.g., see FIG. 4), in some embodiments, the system may be able to also infer an intended one or more intended recipient locations. Using an earlier example above, if the voice message 205 had instead been, "Computer, announce to Bob's office that dinner is ready," the system may determine an intended location (e.g., "Bob's office"). In the example of diagram 201, the intended locations may be inferred to correspond to any suitable locations associated with the home environment. In some embodiments, a location may not be inferred (e.g., in a case where the message is announced to every device affiliated with the home environment, regardless of the present location). In some embodiments, a determined location (e.g., a zone) may be later used by the system for transmitting a subsequent message to a particular zone, for example, when a resident device of the home environment is associated with the particular determined location (e.g., a zone of the home, such as son's bedroom, a living room, etc.).

Although diagram 201 depicts the user 203 speaking directly to the resident device 207, it should be understood that embodiments are not so limiting. For example, in another embodiment, a user device of user 203 (e.g., a mobile phone) may receive the voice message 205, record the message, and then transmit the recording of the voice message 205 to the resident device 207, whereby the resident device 207 may act as a relay device. Also, as described herein, there may be multiple resident devices within the home environment. In some embodiments, each resident device may be configured to perform the process 200. In some embodiments, the resident devices may have synchronized to have a particular resident device (e.g., resident device 207) to coordinate receiving any announcements associated with the home environment, processing the announcement, and then transmitting the announcement to the appropriate user devices and/or other resident devices for presentation of the message. Accordingly, in this example where a particular resident device is selected (e.g., or otherwise chosen) for performing process 200, the voice message 205 may have been received and recorded by another resident device, and the transmitted to resident device 207 for further processing.

In some embodiments, as described herein, the system may be able to also determine the sender's identity. For example, using diagram 201 for illustration, the resident device 207 may perform a voice analysis (e.g., via NLP) of a voice of user 203 to determine the identity of user 203. In another example, whereby the user 203 speaks into a mobile phone (which later transmits the recording to the resident device 207), resident device 207 may determine the identity of the speaker based in part on the identifier information of the mobile device (e.g., as being associated with the user 203). In some embodiments, the system may utilize any suitable technique to determine the identity of the person voicing an announcement.

As described herein, in some embodiments, one or more operations may be performed by another device. For example, upon recording the voice message 205, the resident device 207 may subsequently store the recording of the voice message 205, and then transfer a copy of the recording to a server device (e.g., in the cloud). The server device may then analyze (e.g., classify) elements of the recording to determine splicing data. As described herein, the splicing data may indicate a starting point and ending point within the recording. The server device may then transmit the splicing data back to the resident device 207, upon which the resident device 207 may then splice the previously stored recording to obtain another recording including only the announcement portion of the voice message 205 (e.g., "Dinner is ready"). In some embodiments, the server device may also determine other elements, including, but not limited to, one or more intended recipients, a domain, the sender's identity, etc. These one or more elements may also be transmitted to the resident device 207 for further processing, as described further herein.

In some embodiments, the resident device 207 may augment and/or transform the recording of the announcement (or "announcement"). For example, the resident device 207 augment the audio sound by fading the sound in or out, respectively, at the beginning and end of the recording. The resident device 207 may also change the inflection and/or tone of one or more of the words.

In some embodiments, the resident device 207 may further add an additional portion (e.g., a preamble or other indicator) to the recording, for example, indicating the sender's (e.g., the announcer's) identity. In some embodiments, the determination of whether to indicate the sender's identity may be based in part on a type of user profile associated with the sender. As described herein, there may be a plurality of user profile types (e.g., shared user, administrator, owner, etc.). In some embodiments, an administrator (e.g., owner) profile may be associated with users that have all administrative rights, and can invite administrators and/or shared users to be affiliated with the home environment. In some embodiments, a resident device may be assigned to one or more owners, while the same resident device may be affiliated with a broader set of users of the home environment (e.g., in the case of a resident device that is commonly shared by the home). In some embodiments, an administrator profile may be associated with a user that can administer one or more resident devices of the home environment (e.g., including accessing user profiles of other members). In some embodiments, a shared user profile may be associated with a user (e.g., a guest user, such as a babysitter or housekeeper) who is invited to send and receive messages from the home environment, but may not be able to access the profiles (or other information) of other shared users. It should be understood that any suitable profile types may be utilized to perform embodiments described herein. Using the diagram 201 for further illustration, if user 203 (e.g., "Dad") is an administrator or owner (e.g., as described above), the resident device 207 may enable recipients to know who sent the announcement, and may therefore transform the announcement to correspond to "Announcement from Dad: Dinner is ready." In another example, where the user 203 is a shared user (e.g., associated with a shared user profile), the system may determine that the identity of the shared user should remain anonymous (e.g., at least to other shared users) when sending announcements. Accordingly, in one example, the transformed announcement may correspond to, "Announcement from the home: Dinner is ready." In at least this way, techniques of the present disclosure may enable enhanced privacy protections, while still enabling shared users (e.g., guests), whose associated devices may not include address data (e.g., Internet Protocol (IP) address information, Medium Access Control (MAC) address information, etc.) for other devices associated with a home environment, to still send announcements to other devices associated with the home environment. It should be understood that any suitable technique may be used to create and/or transform an announcement recording, according to techniques of the present disclosure. For example, as further illustrated with respect to FIG. 3, the sender's identity may be indicated via a text format, icon, or other suitable indicator.

At block 204, the system may identify one or more devices for receiving the announcement. Using diagram 201 for further illustration, the system (e.g., resident device 207) may first retrieve one or more user profiles associated with the home environment. For example, as described above with respect to block 202, the system may have previously determined one or more intended recipients for the announcement. For example, the system may have inferred intended recipients (e.g., all affiliated users who are determined to be present within the home environment) for the message based on the content (e.g., determined domain) of the message. In another example, the system may use NLP to determine a recipient identity explicitly mentioned in the message (e.g., "son," "babysitter," etc.). Based on the determined intended recipients, the system may retrieve, for each intended recipient, an associated user profile. In the example of diagram 201, at least two intended recipients are determined each with respective user profiles (e.g., user profile 209 and user profile 211). In some embodiments, the user profiles may have been previously generated and stored (e.g., by the resident device 207 and/or a remote server device) when a new user was associated with the home environment. In some embodiments, the user profiles may be alternatively be stored in the cloud, and then temporarily retrieved by the resident device while performing process 200. In some embodiments, each resident device of the home environment may store user profiles. In some embodiments, any suitable mechanism may be used to maintain user profiles.

In some embodiments, subsequent to retrieving user profiles for each intended recipient, the system may then determine one or more devices for receiving the announcement. For example, turning back to diagram 201, the system may determine that user device 213 is associated with user profile 209, and user devices 216 and 217 are associated with user profile 211. It should be understood that any suitable number of devices may be associated with a particular user profile. The system may identify that each of these devices should receive the announcement for presentation. It should also be understood that each identified recipient device may have a particular device type of a plurality of different device types. The plurality of different device types may include any suitable type, including a mobile device. For example, as depicted in diagram 201, a mobile phone is depicted (e.g., user device 213) and a smartwatch is also depicted (e.g., user device 215). Also, one or more recipient devices may correspond to resident devices that are associated with the home environment. For example, as described herein, one resident device may be associated with multiple users of the home environment (e.g., a smart speaker in the living room, and available for general use). In this example, both user profile 209 and 211 may be associated with the resident device intended for general use, and that resident device may also be included in the list of recipient devices. Another resident device may be associated with a particular user and/or particular zone of the home environment (e.g., a bedroom of user 203).

At block 206, the system may transmit a second message to the one or more recipient devices for presentation. Continuing with diagram 201 for illustration, the system (e.g., resident device 207) may transmit a message to each identified recipient device over one or more networks 219. The second message may be formatted to contain any suitable information that may be used to present the announcement. For example, the second message may contain the announcement recording (e.g., "Dinner is ready"). The second message may also contain other information, including, but not limited to, the sender identity and/or related identifying information (e.g., a profile image or icon), the sender's present location, an identifier for the sending device (e.g., a resident device or user device), a location (e.g., zone of the home environment) for the sending device, instructions for how to present the announcement (e.g., via both audio and transcribed text, a particular color code, a pop-up message), etc. In some embodiments, as described further herein (e.g., see FIG. 3), the recipient device may also determine whether and/or how to present the announcement, based on, for example, the type of recipient device, the location of the recipient device (e.g., a particular zone in the home environment), a proximity of the recipient device to other devices affiliated with the home environment (described further herein)), or other suitable settings. For example, the mobile phone (e.g., user device 213) may present the notification via text, popup/banner, audio, and/or video, while a smart speaker resident device may present the announcement over audio. In another example a smartwatch (e.g., user device 215) may present the announcement via audio and/or text popup/banner. A smart media player connected to a TV may be enabled to additionally present the announcement recording that corresponds to an audiovisual recording.

In some embodiments, as described herein, the particular network path through which the second message may be transmitted may be determined based at least in part on a location of a particular device (e.g., a sender and/or receiver device). For example, suppose that user device 213 is associated with user 114 of FIG. 1, who is presently away from the home environment 101. In this example, the second message may be transmitted by the resident device 207 of the home environment 101 via the Internet (e.g., via a cellular signal). In another example, suppose that user device 215 and 217 are associated with user 112 of FIG. 1, who is depicted as being within the home environment 101. In this example, the resident device 207 may transmit the second message over the LAN of the home environment 101 to each recipient device. In some embodiments, the resident device 207 may first detect whether a recipient device is present within the home environment 101 (e.g., and/or a particular zone) before determining whether to transmit the message to that device. For example, the resident device 207 may include instructions that devices associated with a particular user type (e.g., a shared user type) of the home environment will not receive a relayed message if the device is presently outside the home environment. Suppose that, in one example, user profile 209 is associated with a shared user type, and that user device 213 is associated with user profile 209. In this example, the resident device 207 first detects that user device 213 is not present within the home environment (e.g., by not receiving a ping response over the LAN from user device 213). The resident device 207 may then determine not to transmit a message to user device 213. In another example, if user profile 209 is instead associated with an administrator type, then the resident device 207 may determine to relay the message to user device 213, even though it may be presently away from the home environment. In this way, techniques may enable core members of the home to receive messages at any suitable location (e.g., inside or outside the home), while guest members (e.g., including shared users, such as a housekeeper or babysitter) may receive announcements only when present within the home. This may enhance privacy and/or security features, by ensuring that only authorized user accounts (and/or devices) may send or receive announcements, depending on the context.

In some embodiments, the particular network path may also depend on the location of the sender user device. For example, in a case where the sender device is outside the home environment 101 (e.g., at school), a server device (e.g., associated with the resident device 207) may coordinate routing the message to the appropriate recipient devices (e.g., within the home environment 101 and/or outside the home environment). In a case where at least one of the recipient devices is within the home environment, the server device may route the message to the resident device 207, which may in turn route the message to the user device via the LAN of the home environment 101. In some embodiments, for example, in a case where the entire home (e.g., all affiliated users) is determined to be intended recipients, the system may determine that devices (e.g., user devices and/or resident devices) associated with the sender user profile should be excluded from receiving the second message. In some embodiments, one or more of the sender's devices may receive the second message, although each device may still determine whether and/or how to present the message. For example, another user device of the sender may determine not to popup (e.g., suppress) a notification if it determines that the second message contains an announcement from the sender (although the announcement may still be received, stored, and/or otherwise processed by the other user device). It should be understood that the system may utilize any suitable settings and/or rules for determining which devices should receive the second message.

In some embodiments, upon transmitting the second message including the announcement, the resident device 207 may determine whether the announcement should be deleted from the resident device 207, stored for future record keeping, or otherwise processed by the resident device 207. Likewise, in a case where a remote server was involved in processing the initial recording, the remote server also may be configured to delete (or otherwise archive) the recording (e.g., after a predefined period of time).

Figure 3:
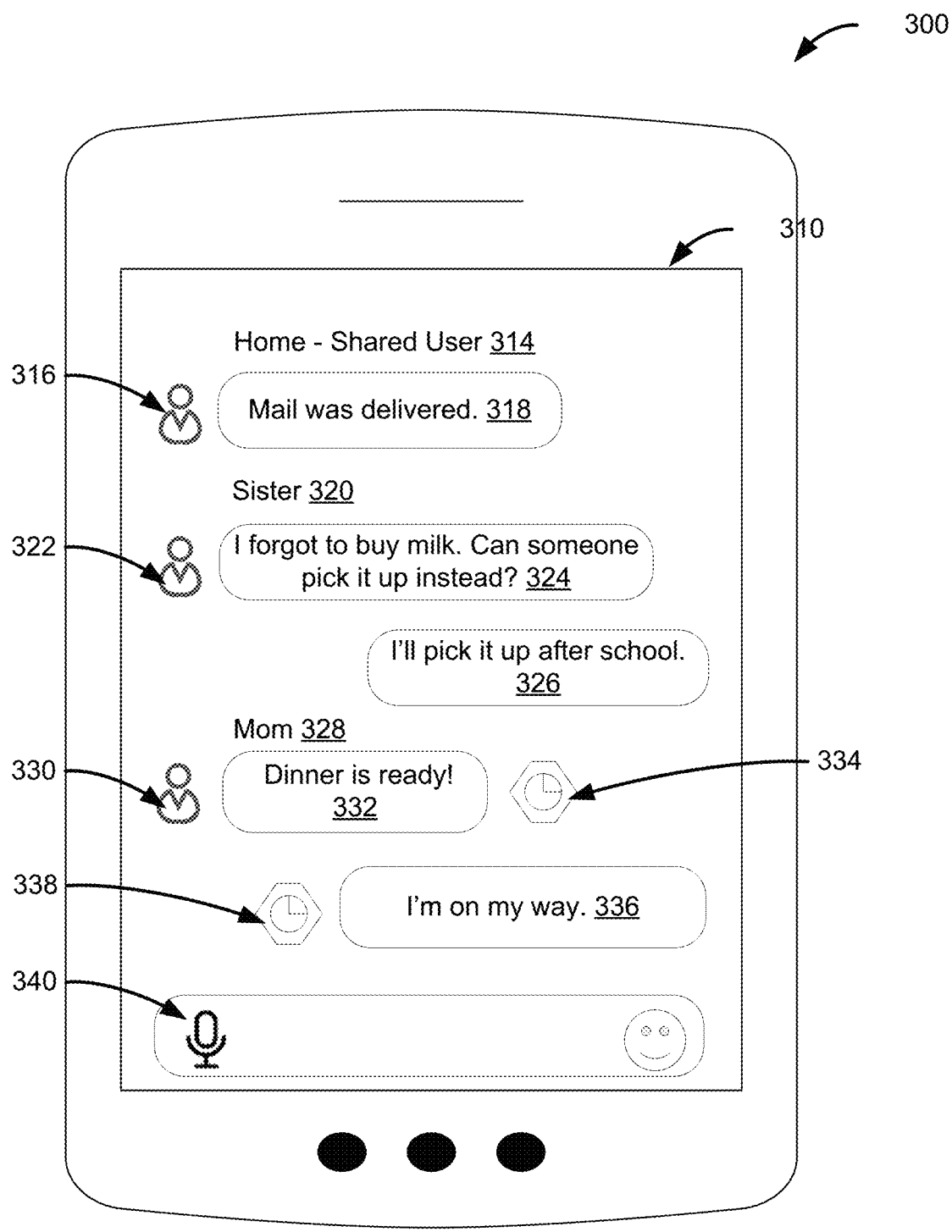

FIG. 3 illustrates an example graphical user interface (GUI) 310 of a device 300 (e.g., a mobile phone) that receives a message that is operable for presentation by the device 300. In some embodiments, the device 300 may be similar to one or more of the other mobile devices described herein (e.g., user device 213 of FIG. 2, user device 124 of FIG. 1, etc.). It should be understood that, although the GUI 310 of FIG. 3 is described with respect to a display of a mobile phone, embodiments should not be construed to be so limited. For example, one or more of the features described with respect to device 300 may also be enabled by another type of device (e.g., another type of mobile device, such as a smartwatch, tablet, smart glasses, etc.). In another example, a resident device (e.g., a smart speaker, a smart media player that is connected to a TV, etc.) may also be configured to enable one or more of the features described with respect to device 300 (e.g., a smart speaker may present an audio sound of an announcement, a smart media player may display a similar GUI for display on a connected TV, etc.).

Turning to GUI 310 in further detail, multiple elements are depicted, including, a first identifier (ID) 314, a first icon 316, a first announcement 318, a second ID 320, a second icon 322, a second announcement 324, a first user response 326, a third ID 328, a third icon 330, a third announcement 332, a first countdown timer 334, a second user response 336, a second countdown timer 338, and a microphone button 340. In some embodiments, other elements may also be displayed, including, but not limited to, a settings icon (e.g., for adjusting settings).

For clarity of illustration, consider an scenario in which the device 300 is associated with an affiliated user of the home environment 101 of FIG. 1. For example, the affiliated user may be a son (e.g., in a family). Other affiliated users of the home environment may include a sister, a mom, a housekeeper, etc. In this scenario, the son may bring the device 300 with him to school (e.g., outside the home environment). At some point in the day, the housekeeper may arrive at the home and pick up the mail for the family. Upon picking up the mail, the housekeeper may voice a message, "Computer, announce that the mail was delivered." In one embodiment, the message may be voiced to and recorded by a resident device of the home environment 101 (e.g., resident device 207 of FIG. 2). In another example, the message may be recorded by a user device (e.g., mobile phone) of the housekeeper, and then transmitted to the resident device 207 for further processing, as described herein. The resident device 207 may identify the announcement from the message (e.g., "Mail was delivered."), as described herein. The resident device 207 may also identify the sender as being the housekeeper. In one example, the resident device 207 may identify the sender via a voice recognition, if voiced directly to the resident device 207 (a smart speaker). In another example, the resident device 207 may identify the sender as being the housekeeper via a device and/or user identifier received from the housekeeper's mobile phone, which may be associated with the home environment. In one example, the housekeeper may be associated with a shared user profile. The resident device 207 may identify device 300 (e.g., among one or more other devices) for receiving the announcement, and then may transmit a message containing the announcement (e.g., a recording and/or transcription of the announcement) to the device 300. As described herein, the network path via which the message is transmitted may depend in part on the location of the sender device and/or recipient device. In this example above, the resident device 207 may transmit the message from the home environment over the WAN (e.g., the Internet) to the recipient device 300 (e.g., via a server device affiliated with the resident device 207).

Upon device 300 receiving the announcement, an application (e.g., and/or service) executing on the device 300 may present the announcement along with information about the message within the GUI 310. For example, as depicted within GUI 310, the first ID 314 may indicate that the announcement was sent from the "Home" (e.g., the home environment 101) and that the sender is a shared user. Note that, in this case, because the sender was the housekeeper (who may have a shared user profile), the identity of the housekeeper may not be revealed. As described herein, this may enable better support for privacy controls when transmitting announcements via techniques of the present disclosure. It should be understood that any suitable types and/or scopes of privacy controls may be supported. The GUI 310 may also display the first icon 316, which may correspond to an icon (e.g., image, marker, or other suitable identifier) associated with the sender. In this case, the icon may be a generic icon, to preserve the anonymity of the sender (e.g., from being visible to other shared users). The GUI 310 may also display the first announcement 318 (e.g., "Mail was delivered"). In this illustration, a transcription of the text is also presented within a text field. In one embodiment, the user of device 300 may tap on the text field (or other suitable GUI element), whereby the device 300 may present an audio (and/or video) recording of the announcement. It should be understood that, as depicted in GUI 310, a chronological list of announcements is displayed from top to bottom. Accordingly, at the time that the first announcement 318 is presented, other announcements and/or responses (e.g., the second announcement 324, the first user response 326, etc.) may not yet be presented. In some embodiments, in addition to (and/or alternatively to) displaying GUI 310, one or more other suitable notifications of the first announcement 318 may be presented. For example, a banner notification may pop-up on the screen, whereby upon receiving a tap of the banner from the user, the GUI 310 may be presented. In another example, whereby the device 300 is a different kind of device (e.g., a smart speaker), a distinctive light may illuminate on the smart speaker, indicating that an announcement is ready to be presented. In some embodiments, the announcement may automatically be presented immediately upon being received by the device 300. It should be understood that any suitable form of notifications and/or presentations of the announcement may be enabled, according to techniques of the present disclosure.

Continuing with the illustration based on the above scenario, at a later time that is subsequent to receiving the message containing the first announcement 318, the sister of the son (e.g., also affiliated with the home environment) may also want to send an announcement to members of the home environment. In some embodiments, this announcement may be transmitted according to a similar method as described above. For example, the device 300 may receive another message from resident device 207, whereby the device 300 may present the sister's announcement along with information about the message within the GUI 310. For example, the second ID 320 may indicated that the sender is the "Sister." In one embodiment, the second ID 320 may also indicate the location (e.g., zone and/or room) of the sender. Also, the third icon 330 may correspond to an image (or avatar, etc.) associated with the sister's profile. In this example, note that the second ID 320 and/or the second icon 322 may indicate the identity of the sender. In one example, this may be because the user profile associated with the sister is an administrator or owner profile (e.g., not a shared user profile). Using the example of GUI 310, the second announcement 324 may be, "I forgot to buy milk. Can someone pick it up instead?" Upon the device 300 presenting the announcement for display in the GUI 310 (e.g., similar to as described above), the device 300 may further receive input corresponding to a response message from the son. For example, the microphone button 340 may receive a tap from the son, upon which the device 300 records the first user response 326 (e.g., a recording) from the son, "I'll pick it up after school." In some embodiments, the first user response 326 (e.g., a message) may be sent to any suitable one or more devices and/or locations (e.g., zones) affiliated with the home environment. For example, in one embodiment, the first user response 326 may be sent only to the sender's device (e.g., the sister's user device, and/or other resident device (e.g., resident device 207) that transmitted the second announcement 324 to the device 300). In another embodiment, the first user response 326 may be sent only to devices currently present within the home environment (e.g., home environment 101), and thus receiving messages over the LAN associated with the home environment. In another embodiment, the first user response 326 may be sent to all affiliated devices of the home environment. This may include both user devices and/or resident devices, whereby the user devices (e.g., mobile devices) may be within or outside the home environment. In some embodiments, the first user response 326 may be automatically directed to a resident device in the location (e.g. zone of the home environment) near where the message was sent from. In some embodiments, the destination of the first user response 326 may depend in part on a predefined time frame in which the first user response 326 is sent. For example, if the sons replies to the sister's announcement within a short time frame (e.g., a few seconds, a minute), the first user response 326 may be directed back to only the sender's device (e.g., the sister's mobile phone). In some embodiments, as described herein (e.g., see FIG. 4), the device 300 may receive other input (e.g., from the son) corresponding to any suitable instructions regarding the first user response 326. For example, the device 300 may receive input directing the first user response 325 to a particular location (e.g., zone) of the home environment.

It should be understood that, similar to as described herein with respect to transmitting an announcement from a sender device to one or more recipient devices, the particular network path of a response message (e.g., from a responder device to one or more devices to receive the response message) may depend in part on the location of the responder and/or receiver devices. For example, in a case where a recipient device of a response message is outside the home environment, a device server (e.g., associated with a resident device of the home environment) may coordinate routing the message to the recipient device via the WAN. In a case where the recipient device is within the home environment, the resident device (e.g., resident device 207) may route the message to one or more devices via the LAN.

Continuing with the illustration based on the above scenario, at a later time that is subsequent to the device 300 transmitting the first user response 326, mom may send an announcement to the house, which may be received and/or presented by device 300 similar to as described above. For example, the third ID 328 may identify the sender as "Mom," and may include the third icon 330 corresponding to an icon associated with mom's user profile. In this example, the third announcement 332 may correspond to "Dinner is ready!" In one example, this third announcement 332 is received later in the afternoon, after son has already returned home from school and the device 300 is now present within the home environment (e.g., in son's bedroom). Mom may have voiced the announcement into a resident device in the kitchen (e.g., resident device 207), upon which the resident device then transmitted the announcement recording over the home environment LAN to the device 300. In one example, only devices currently present within the home environment may receive this message (e.g., via the LAN), and devices away from the home environment may not receive the message (e.g., since the dinner announcement may not be relevant to them). As described herein, it should be understood that any suitable device(s) and/or locations may be suitable intended recipients for the announcement.

In some embodiments, an announcement that is received by a device may only persist on the device for a predefined period of time, after which the announcement (e.g., recording and/or transcription message) disappears (or is archived). In the depiction of FIG. 3, the first countdown timer 334 indicates that the announcement from mom was recently received, and will disappear after the first countdown timer 334 completes. Upon the device 300 receiving the third announcement 332, the son may reply with the second user response 336, "I'm on my way," which may be performed via the microphone button 340 (which may include other suitable input mechanisms, including video, text, etc.), similar to as described above. In this example the second countdown timer 338 may also indicate on the son's device (e.g., and other devices that receive the second user response 336) that the son's second user response 336 may also disappear after the timer completes.

As described herein, in some embodiments, the device 300 (e.g., via the GUI 310) may enable the user to configure one or more settings. In some embodiments, the device 300 may be configured to suppress (or enable) notifications based on a determined location of the device 300. For example, suppose that when mom had sent the third announcement 332 that "Dinner is ready!," the device 300 was currently away from the home environment (e.g., at the son's school). The device 300 may have a setting that indicates that, if the device 300 receives a message from the home environment while the device 300 is away from the home environment, the device 300 will not present the announcement (and/or a notification of the announcement). In this example, upon receiving the third announcement 332, the device 300 may suppress the message. In another example, with the same setting, if the device 300 were present within the home environment (e.g., home environment 101) and received the third announcement 332 over the LAN, the device 300 may present the announcement. Any suitable settings may be utilized to perform embodiments disclosed herein (e.g., always suppress messages from the home environment, never suppress, suppress only away from home, etc.). It should be understood that, in some embodiments, settings regarding message transmission and message reception may be configurable on both sender and/or receiver devices. For example, as described herein, instead of the device 300 determining to suppress a notification of the third announcement 332, the resident device that transmits the message (e.g., resident device 207) may determine not to transmit the message to device 300 in the first place, upon detecting that device 300 is not within the home environment.

Figure 4:
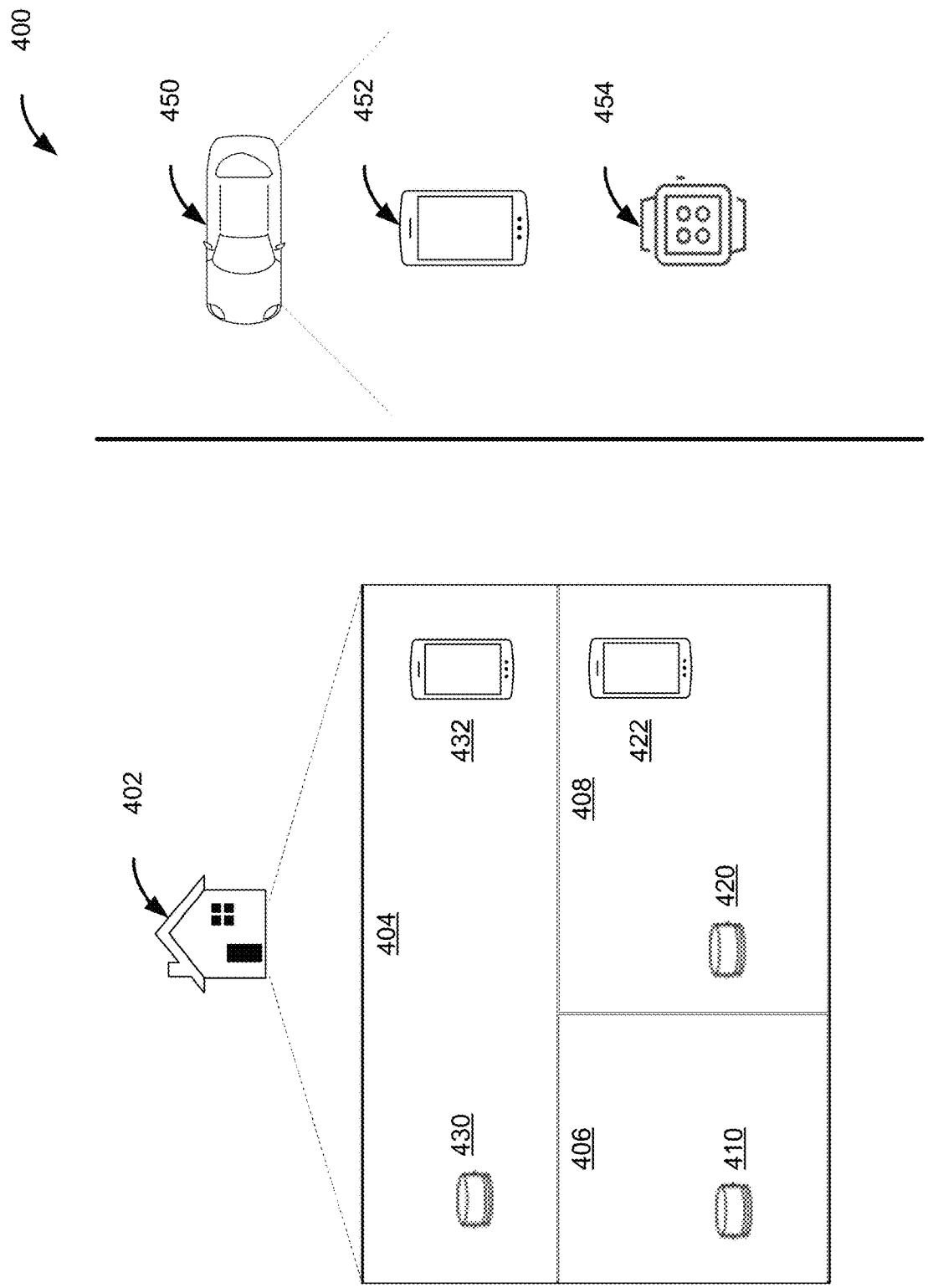

FIG. 4 is another simplified block diagram 400 illustrating at least some example techniques for transmitting a message to a particular user device(s) for presentation of an announcement, according to some embodiments. In diagram 400, a home environment 402 and a vehicle 450 are depicted. In some embodiments, the home environment 402 may be similar to some aspects of the home environment 101 of FIG. 1. The vehicle 450 may be external to the home environment (e.g., depicted via the vertical line divider in diagram 400), for example, in transit to another destination (e.g., returning home from work, in transit to the work office, etc.). It should be understood that, in some embodiments, vehicle 450 may instead represent any suitable location that is external to the home environment 402.

Turning to the elements of the home environment 402 in further detail, multiple elements are depicted. The home environment 402 contains three different zones, zone 404, zone 406, and zone 408. In some embodiments, each zone may correspond to a different location within the home environment. For example, zone 404 may correspond to a family room, zone 406 may correspond to a kitchen, and zone 408 may correspond to a bedroom. As depicted in FIG. 4, a resident device 430 (e.g., a smart speaker) may be positioned within the zone 404 and may be associated with the family room. Similarly, a resident device 410 (e.g., a smart speaker) may be positioned within zone 406 and associated with the kitchen, and a resident device 420 (e.g., a smart speaker) may be positioned within zone 408 and associated with the bedroom. In some embodiments, one or more associations (e.g., between a resident device and a particular zone) may be stored by one or more resident devices of the home environment 402. In some embodiments, the associations may also be stored by a remote server device associated with the resident devices. Also included within the home environment 402 is a user device 432 (e.g., a mobile phone), which may be presently located within the zone 404 at the opposite end of the family room from the resident device 430. Another user device 422 (e.g., another mobile phone) is presently located within zone 408 (i.e., the bedroom). As depicted in FIG. 4, the proximity of the user device 422 to the resident device 420 within zone 408 may be greater than the proximity of the user device 432 is to the resident device 430 within zone 404.

Turning to the elements of the vehicle 450 in further detail, multiple elements are depicted. For example, a user device 452 (e.g., a tablet device) and a user device 454 (e.g., a smartwatch) are located within the vehicle 450 that is in transit. In this example, both the user device 452 and user device 454 may be proximate to each other (e.g., being carried and/or worn by a user driving the vehicle 450).

In some embodiments, a message that includes an announcement may be transmitted by any one of the devices depicted in diagram 400 to one or more devices and/or locations (e.g., zones) associated with the home environment 402 for presentation. In some embodiments, a sending device may receive instructions corresponding to a selection of a particular set (e.g., a subset) of devices associated with the home environment 402 for receiving the announcement. In some embodiments, the sending device may also (or alternatively) receive instructions corresponding to a selection of a particular one or more locations (e.g., one or more zones) for receiving the message. As described herein, any one of the resident devices (e.g., resident device 410, resident device 420, and/or resident device 430) may be used to transmit an announcement to other devices and/or locations within the home environment 402. Also, in some embodiments, a user device (e.g., associated with an administrator or owner profile) may be enabled to directly send the announcement to other devices. For example, the user device may store user profiles of other users, associated devices, and/or other suitable associations operable for transmitting announcements to devices associated with the home environment. In some embodiments, a server device that is associated with the resident devices of the home environment may also be configured to transmit announcement to one or more devices associated with the home environment. Accordingly, although a resident device may be primarily described in embodiments herein as transmitting announcements to other devices, embodiments should not be construed to be so limiting (e.g., a suitable user device and/or server device may also perform the operations of embodiments described herein).

In some embodiments, a sending device (e.g., a resident device, or suitable user device) may be configured to transmit an announcement to a particular device (e.g., a particular user device and/or a particular resident device) based on a detected proximity between one or more devices. In some embodiments, one or more devices associated with the home environment 402 may transmit location information (e.g., GPS coordinates, velocity and/or acceleration information, etc.) to a resident device of the home environment. In some embodiments, any suitable real-time location service (RTLS) may be used to determine location information (e.g., location data) of a device. Based on the location information determined with respect to each device, the resident device may determine a location of each device and/or a relative proximity between devices. As illustrated further in representative scenarios described below, this location and/or proximity information may be used to select a particular one or more devices for transmitting the announcement.

Consider a first scenario in which resident device 410 (e.g., in the kitchen that corresponds to zone 406) receives a voice input from a user (e.g., mom) corresponding to an announcement (e.g., "Son, dinner is ready."). In this scenario, as described herein, the resident device 410 may determine which one or more devices to transmit a message including the announcement. In one example, the resident device 410 may determine that the son's user device (e.g., user device 422) is in the son's bedroom (e.g., zone 408), for example, based on location information received from user device 422. The resident device 410 may also store data corresponding to an association between resident device 420 and zone 408 (e.g., based on a determined location of resident device 420). In this example, the resident device 410 may determine to transmit the announcement to the resident device 420 instead of (or in addition to) user device 422. For example, the resident device 410 may be configured with a setting, such that when the resident device 410 determines that a particular user device is proximate to another resident device in the home environment (e.g., resident device 420), the resident device 410 should transmit the announcement to the resident device for presentation (e.g., via the speaker) instead of the proximate user device. In some embodiments, this may reduce the potential for overwhelming a user with notifications via multiple devices. In some embodiments, as described further herein (e.g., with respect to FIG. 10), the resident device 410 transmits the message including the announcement to both the resident device 420 and the user device 422, whereby the respective recipient devices determine whether to suppress or present the message based on a verification of one or more conditions (e.g., proximity to other nearby devices, a time of day, a location of the device, etc.).

Consider a second scenario that is similar to the first scenario above. In this scenario, the resident device 410 receives input from a user (e.g., mom) corresponding to an announcement (e.g., "Dad, can you help me in the kitchen?"). In this scenario, suppose that dad is presently within the family room (e.g., zone 404) with his user device (e.g., user device 432) at one end of the family room. In this example, the resident device 410 may determine that, while user device 432 may be within the same zone 404 as resident device 430, they are not proximate to each other (e.g., based on predefined distance threshold). Accordingly, in this example, the resident device 410 may transmit the announcement to both the resident device 430 and the user device 432 for presentation (e.g., respectively, via a speaker of the resident device 430 and for display and/or audio presentation on the user device 432). Also, in this example, the resident device 410 may determine to not transmit the announcement to either resident device 420 of zone 408 (e.g., in the son's bedroom) or the son's user device 422.

Consider a third scenario in which the resident device 410 receives input corresponding to an announcement, "Announce to son and dad that dinner is ready." In this scenario, the resident device 410 may determine a particular subset of one or more devices associated with the home environment 402 for transmitting the message including the announcement. For example, the resident device 410 may determine to transmit the announcement to resident device 430, user device 432, and resident device 420 for presentation by each device. In one example, these devices may be selected based on a determined location of son's user device and dad's user device within the home environment 402, respectively, relative to other devices in the home environment 402. In another example, the announcement may be, "Announce to the family room and son's bedroom that dinner is ready." In this example, the resident device 410 may determine one or more recipient devices (e.g., resident device 430 and resident device 420) based on associations between zones of the home environment 402 (e.g., zone 404 and zone 408) and a location of each resident device.

Consider a fourth scenario in which the resident device 410 receives input corresponding to an announcement, "Announce to son to pick up groceries on the way home from school." In this scenario, suppose that son is currently away from the home environment 402. For example, son is currently driving vehicle 450 home from school. Also, son may be carrying user device 452 (e.g., the mobile phone) on his person and may be wearing the user device 454 (e.g., the smartwatch). In this example, the resident device 410 may determine that user device 452 is proximate to user device 454. The resident device 410 may further be configured to prioritize which device to send the announcement to if the device is proximate to another device associated with the home environment 402 (e.g., prioritizing the mobile phone over the smartwatch, or vice versa). The resident device 410 may then transmit the announcement to the mobile phone for presentation (e.g., instead of the smartwatch).

It should be understood that various scenarios described in reference to diagram 400 are representative. One or more aspects (e.g., variables) of each scenario may be changed, and still perform embodiments as described herein, including, but not limited to, the particular sender device, the sender device location, the locations of other resident devices within zones of the home environment, the location of one or more candidate recipient devices (e.g., within or outside the home environment), the recipients' user profile types, the type of recipient device (e.g., resident device or user device), the settings of each device, etc. For example, in one embodiment, there may be more than one resident device in a particular zone (e.g., multiple smart speakers). In this embodiment, the announcement may be transmitted to the multiple smart speakers, whereby the smart speakers may synchronize the audio presentation of the announcement within the particular zone (e.g., based on a synchronized clock time between the resident devices). In another example, a particular zone (e.g., the nursery room) of a home environment may be excluded from receiving and presenting an announcement.

Figure 5:
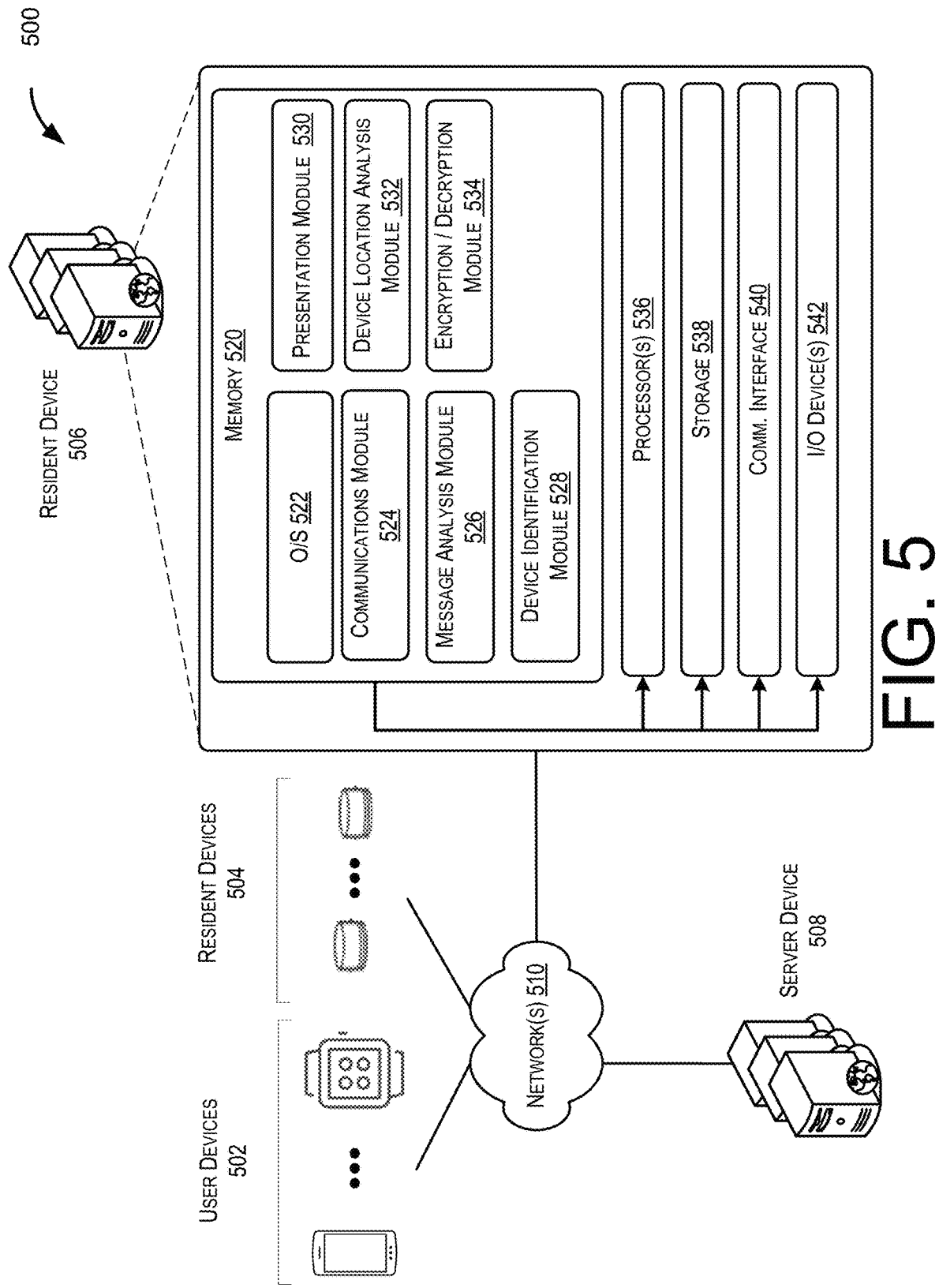

FIG. 5 is another simplified block diagram 500 illustrating an example architecture of a system used to transmit a message to one or more devices for presentation of an announcement, according to some embodiments. The diagram 500 includes one or more user devices 502, one or more resident devices 504, a server device 508, one or more network(s) 510, and a representative resident device 506 (which may one of the one or more resident devices 504). Each of these elements depicted in FIG. 5 may be similar to one or more elements depicted in other figures described herein. For example, the user devices 502 may be similar to any of the other user devices described herein, and so forth. In some embodiments, at least some (e.g., and/or all) elements of diagram 500 may operate within the context of a home environment (e.g., home environment 101 of FIG. 1, home environment 402 of FIG. 4).

Turning to each element in further detail, a user device of the user devices 502 may be any suitable computing device (e.g., a mobile phone, tablet, personal computer (PC), smart glasses, a smart watch, etc.). In some embodiments, a user device may perform any one or more of the operations of user devices described herein. Depending on the type of user device and/or location of the user device (e.g., within the home environment or outside the home environment), the user device may be enabled to communicate using one or more network protocols (e.g., a Bluetooth connection, a Thread connection, a ZigBee connection, an Infrared connection, a WiFi connection, etc.) and/or network paths over the network(s) 510 (e.g., including a LAN and/or WAN), described further herein. In some embodiments, a user device will be connected to another device (e.g., a TV), through which the user device may provide data (e.g., notification messages, instructions, user interfaces) for presentation. As described herein, in some embodiments, a user device may be enabled to transmit and/or receive messages to/from other devices of the home environment. In some embodiments, a user device may determine whether (and/or when) to present or suppress an announcement (and/or notification of an announcement) from being displayed based one or more rules. These rules may indicate conditions under which the announcement will be presented (e.g., displayed) or suppressed. Some non-limiting examples of conditions that may impact whether an announcement is presented or not may include a present location of the user device (e.g., within or outside the home environment), a relative location to other user devices (and/or resident devices), a time of day, a present activity associated with the user account of the user device, a user preference stored on the user device, etc.

In some embodiments, the server device 508 may be a computer system that comprises at least one memory, one or more processing units (or processor(s)), a storage unit, a communication device, and an I/O device. In some embodiments, the server device 508 may perform any one or more of the operations of server devices described herein. In some embodiments, these elements may be implemented similarly (or differently) than as described in reference to similar elements of resident device 506. In some embodiments, the storage unit of the server device 508 may store data received from one or more devices of diagram 500. For example, the storage unit may store a list of user profiles and/or a list of user devices of the home environment. The storage unit may also store one or more configuration settings (e.g., indicating a prioritized list of devices to contact based on a determined proximity between devices). In some embodiments, the server device 508 may be used to route messages to/from the home environment to/from other affiliated devices presently outside the home environment.

In some embodiments, the resident devices 504 may correspond to any one or more of the resident devices described herein. For example, the resident devices 504 may correspond to one or more of the resident devices of the home environment 402 of FIG. 4. Each resident devices 504 may be any suitable computing device (e.g., a mobile phone, tablet, a smart speaker device, a smart media player communicatively connected to a TV, etc.). In some embodiments, a resident device may be positioned in a particular location (e.g., a zone) of the home environment.

In some embodiments the one or more network(s) 510 may include a WAN (e.g., the Internet) and/or a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 508 may be external to the home environment, and thus, communicate with other devices over the WAN. In some embodiments, the resident devices 504 may typically be resident within the home environment and communicate with other devices of the home environment over the LAN. In some embodiments, the user devices 502 may be transient. For example, as described herein, a user device may be present within the home environment (e.g., and communicate over the LAN), while, in another example, the user device may be outside the home environment and communicate over the Internet (or other suitable network).

As described herein, resident device 506 may be representative of one or more resident devices of the resident devices 504. In some embodiments, one or more of the features of resident device 506 may also be implemented by server device 508 and/or one or more of the user devices 502. The resident device 506 has at least one memory 520, one or more processing units (or processor(s)) 536, a storage unit 538, a communications interface 540, and an input/output (I/O) device(s) 542.

Turning to each element of resident device 506 in further detail, the processor(s) 536 may be implemented as appropriate in hardware, computer-executable instructions, firmware or combinations thereof. Computer-executable instruction or firmware implementations of the processor(s) 536 may include computer-executable or machine executable instructions written in any suitable programming language to perform the various functions described.

The memory 520 may store program instructions that are loadable and executable on the processor(s) 536, as well as data generated during the execution of these programs. Depending on the configuration and type of resident device 506, the memory 520 may be volatile (such as random access memory (RAM)) and/or non-volatile (such as read-only memory (ROM), flash memory, etc.). In some implementations, the memory 520 may include multiple different types of memory, such as static random access memory (SRAM), dynamic random access memory (DRAM) or ROM. The resident device 506 may also include additional storage 538, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 538 may be utilized to store data contents received from one or more other devices (e.g., server device 508, other resident devices 504, and/or user devices 502). For example, the storage 538 may store user profiles of users affiliated with the home environment. The storage 538 may also store configuration settings, for example, indicating instructions for transmitting announcements to devices affiliated with the home environment.

The resident device 506 may also contain the communications interface 540 that allows the resident device 506 to communicate with a stored database, another computing device or server, user terminals, and/or other devices on the network(s) 510. The resident device 506 may also include I/O device(s) 542, such as for enabling connection with a keyboard, a mouse, a pen, a voice input device, a touch input device, a display, speakers, a printer, etc. In some embodiments, the I/O devices(s) 542 may be used to output information related to an announcement and/or notification of an announcement. This may include, but is not limited to, a light that may illuminate in a particular way (e.g., a particular color, flash, etc.) when an announcement arrives, an audio, video, and/or text that is presented when an announcement arrives, etc.

Turning to the contents of the memory 520 in more detail, the memory 520 may include an operating system 522 and one or more application programs or services for implementing the features disclosed herein, including a communications module 524, a message analysis module 526, a device identification module 528, a presentation module 530, a device location analysis module 532, and an encryption/decryption module 534. In some embodiments, any one or more of the application programs or services of resident device 506 (or any other features of resident devices described herein) may be used to implement the messaging service 130 of FIG. 1.

The communications module 524 may comprise code that causes the processor 536 to generate messages, forward messages, reformat messages, and/or otherwise communicate with other entities. For example, as described herein, the communications module 524 may transmit and/or receive messages to/from other user devices 502, other resident devices 504, and/or the server device 508. As described herein, the communications module 524 may transmit messages via one or more network paths of network(s) 510 (e.g., via a LAN associated with the home environment and/or a WAN).

The message analysis module 526 may comprise code that causes the processor 536 to receive and process a message that includes an announcement associated with a voice that spoke the announcement. In some embodiments, one or more of the operations of message analysis module 526 may be similar to those described in reference to block 202 of FIG. 2. For example, the message analysis module 526 may obtain an announcement recording from the message by using splicing data to splice the original recording. The message analysis module 526 may also determine, for example, a sender's identity, a sender's location, and other suitable information from the message.

The device identification module 528 may comprise code that causes the processor 536 to identify one or more devices for receiving the announcement. In some embodiments, one or more of the operations of device identification module 528 may be similar to those described in reference to block 204 of FIG. 2. For example, the device identification module 528 may retrieve one or more user profiles (e.g., from storage 538) and identify one or more devices associated with each user profile. In another example, the device identification module 528 may further identify one or more candidate recipient devices based on device location and/or proximity data, as described below in regards to the device location analysis module 532. In some embodiments, the device identification module 528 may determine one or more user types (e.g., of user accounts) associated with a home environment, for example, an administrator type, a shared user type, etc. In some embodiments, a user type may be associated with a particular profile that indicates a set of rules associated with receiving and/or transmitting messages from a device associated with the particular user type. The rules may indicate, for example, one or more privacy and/or security constraints, as described herein. In one example, a device associated with a shared user type may be able to receive messages while located within the home environment, but may not receive announcements when located outside the home environment. In another example, a device associated with a shared user type may be able to transmit announcements to other devices of the home while located within the home environment, but not while located outside the home environment. In yet another example, a relayed message including an announcement associated with an administrator type account may be formatted to include PII indicating the identity of the administrator user (e.g., mom, dad, etc.), while a shared user type account may not include PII associated with the sender. In some embodiments, the device identification module 528 may also identify one or more recipient user accounts (and/or associated devices) based in part on determining the sender user account (and/or sender user account type). It should be understood that any suitable rules may be utilized to determine the one or more devices for receiving a relayed message and/or determining a format for the message, including, but not limited to, the sender account type, the sender device type, an identity of the sender account user, recipient user account types, an identity of a recipient account user, a type or location of a recipient device, etc.

The presentation module 530 may comprise code that causes the processor 536 to present the announcement. In some embodiments, the presentation of the announcement may be similar to as described in reference to FIG. 3. In some embodiments, the presentation of the announcement may depend in part on the type of recipient device (e.g., a mobile phone, a smart watch, a smart speaker, etc.). In some embodiments, a notification of the announcement may also accompany the announcement. In some embodiments, as described herein, a notification and/or announcement may be presented (or suppressed) based in part on a setting that is stored on the resident device 506 (and/or a setting of the recipient device).

The device location analysis module 532 may comprise code that causes the processor 536 to determine a location of a particular device. In some embodiments, one or more of the operations of device location analysis module 532 may be similar to those described in reference to FIG. 4. For example, the device location analysis module 532 may receive location information from one or more user devices 502 and/or resident devices 504, which is used to determine the location of each device.

The encryption/decryption module 534 may comprise code that causes the processor 536 to encrypt and/or decrypt messages. For example, the encryption/decryption module 534 may transmit an encrypted recording of an announcement (e.g., received via a microphone of the resident device 506) in a message sent to the server device 508. In one example, the server device 508 may not have access to a cryptographic key operable for decrypting the encrypted message. The server device 508 may route the message to the appropriate recipient device, whereby the recipient device may have access to the cryptographic key (e.g., shared with one or more devices affiliated with the home environment) and use the key to decrypt the recording. Suitable data encryption algorithms may include DES, tripe DES, AES, etc. In some embodiments, the server device 508 may also store encryption keys that can be used with such encryption algorithms. The encryption/decryption module 534 may utilize symmetric or asymmetric encryption techniques to encrypt and/or verify data.

Figure 6:
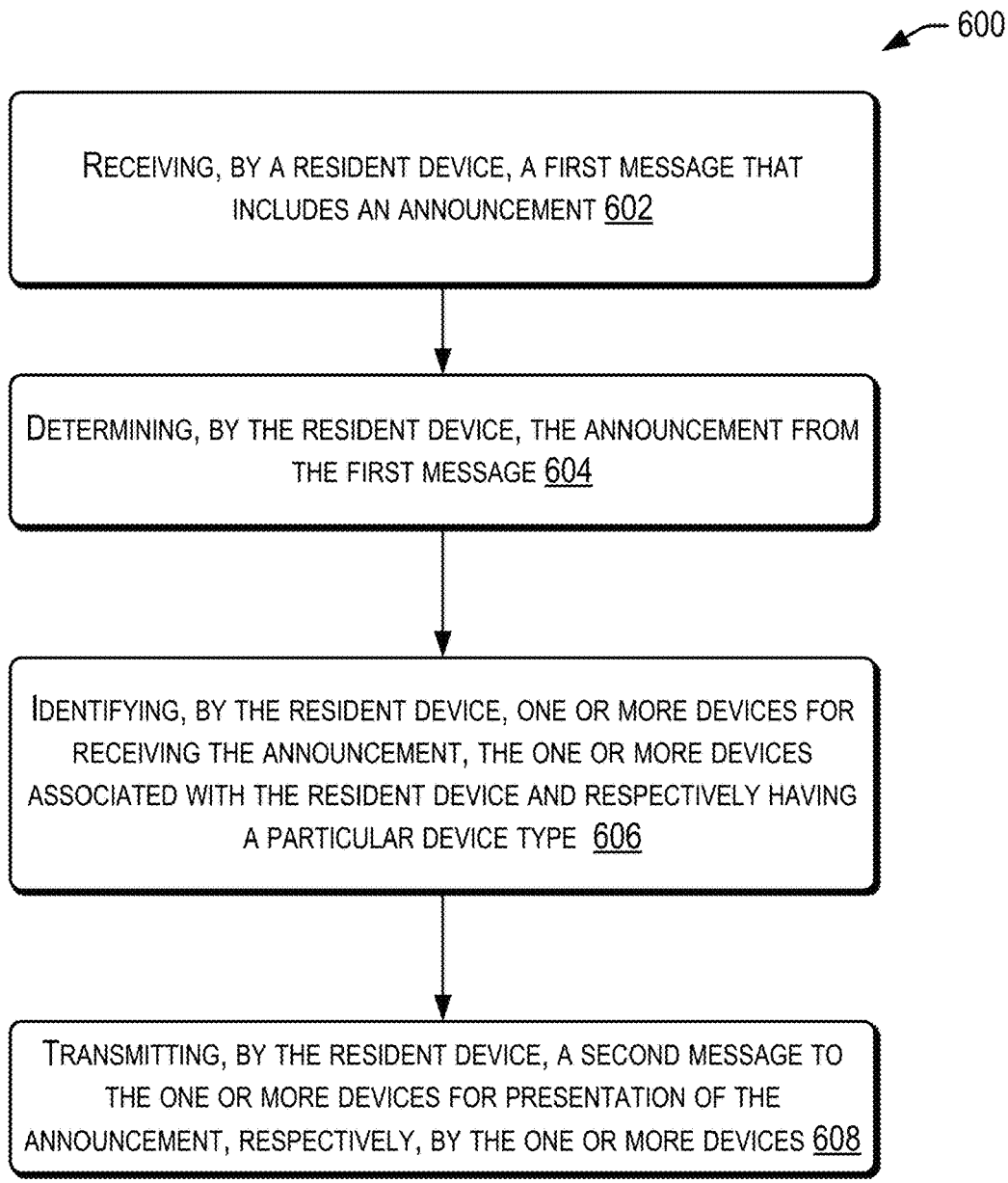

FIG. 6 is a simplified flow diagram illustrating an example process 600 for transmitting a message to one or more devices for presentation of an announcement, according to some embodiments. In some embodiments, process 600 (process 700 of FIG. 7, process 900 of FIG. 9, and/or process 1100 of FIG. 11) may be performed by a resident device, which may correspond to any one or more of the resident devices described herein. In some embodiments, process 600 (process 700, process 900, and/or process 1100) may also (or alternatively) be performed by a server device or user device, which may, respectively, correspond any of the server devices or user devices described herein. In some embodiments, process 600 (process 700, process 900, and/or process 1100) may be performed within the context of a home environment (and/or devices associated with the home environment). Process 600, process 700, process 900, and process 1100 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 602, a resident device (e.g., of a home environment) may receive a first message that includes an announcement. In some embodiments, the first message may include an audio recording, whereby the audio recording includes an announcement associated with a voice that spoke the announcement. In some embodiments, one or more of the operations of block 602 may be similar to one or more operations described in reference to block 202 of FIG. 2.

At block 604, the resident device may determine the announcement from the first message. In some embodiments, the resident device may determine the announcement by utilizing a NLP model that is trained to analyze the recording, as described herein. In some embodiments, the NLP model may be executed locally by the resident device. In some embodiments, the recording may be transmitted to a server device (e.g., server device 508 of FIG. 5) for executing the NLP model. In some embodiments, the NLP model may be used to determine splicing data that indicates a start point and an end point of the announcement within the recording. The resident device may utilize the splicing data to splice the recording to obtain the announcement.

At block 606, the resident device may identify one or more devices for receiving the announcement, whereby the one or more devices are associated with the resident device and respectively have a particular device type. In some embodiments, one or more of the operations of block 606 may be similar to one or more operations described in reference to block 204. In some embodiments, the resident device may maintain one or more user profiles that are respectively associated with the home environment. Each user profile may further be associated with one or more devices (e.g., user devices and/or resident devices). The resident device may identify the one or more devices for receiving the announcement based on the devices identified based on the user profiles maintained (e.g., stored and/or retrieved) by the resident device. In some embodiments, each device of the one or more devices may have a particular device type of a plurality of different device types (e.g., a mobile device type, a resident device type, etc.).

At block 608, the resident device may transmit a second message to the one or more devices for presentation of the announcement, respectively, by the one or more devices. In some embodiments, one or more of the operations of block 608 may be similar to one or more operations described in reference to block 206. In some embodiments, the network path that is used to transmit the second message to a particular device may depend in part on the location of the particular path. For example, the resident device may transmit the second message over a LAN associated with the home environment to a device that is within the home environment. The resident device may also transmit the second message over a WAN (e.g., the Internet) to a device affiliated with the home environment that is currently away from the home environment.

FIG. 7 is another simplified flow diagram illustrating an example process for transmitting a message containing an announcement to a particular user device for presentation of the announcement on the particular user device. In some embodiments, one or more of the operations of process 700 may be similar to as described in reference to FIG. 4.

At block 702, a resident device may receive a first message that includes an announcement, whereby the first message indicates a recipient user account for receiving the announcement. In some embodiments, one or more of the operations of block 702 may be similar to one or more operations described in reference to block 602. In block 702, the first message may also indicate the recipient user account, for example, based on an element (e.g., a trigger mechanism) within a recording of the announcement. For example, the announcement, "Son, please come to the kitchen," may be determined to be intended for a "son" that is affiliated with the home environment. The son may be associated with a user account (e.g., a user profile) of the home environment, whereby the user profile may indicate one or more devices associated with the son. In some embodiments, other suitable information may be included within the first message, which may be used to determine a recipient person and/or device for the announcement. For example, the information may indicate an intended location (e.g., a zone) within the home, such as a particular room.

At block 704, the resident device may obtain the announcement from the first message. In some embodiments, one or more of the operations of block 704 may be similar to one or more operations described in reference to block 604.

At block 706, the resident device may obtain the recipient user account associated with the first message, whereby the recipient user account is associated with one or more devices. In some embodiments, one or more of the operations of block 706 may be similar to one or more operations described in reference to block 606.

At block 708, the resident device may identify a particular user device of the one or more devices associated with the recipient user account. In some embodiments, the resident device may identify the particular user device based on one or more factors. For example, the resident device may store instructions indicating a priority order for transmitting announcement messages to devices associated with a particular user account. In some embodiments, the priority order may indicate which device should be selected for receiving the announcement based on an identification of which one or more devices associated with the user account are proximate to each other. In some embodiments, a particular location data of a device may be associated with a level of confidence. The level of confidence may be one of the variables considered when determining whether devices are proximate to each other and/or which device should be selected. For example, the resident device may detect respective locations of the particular user device and a second user device of the one or more devices associated with the recipient user account. The resident device may further detect that the second user device (e.g., a smartwatch) of the one or more devices associated with the recipient user account is proximate (e.g., nearby, within a predefined distance threshold) to the particular user device (e.g., a mobile phone). The resident device may identify the mobile phone for transmitting the announcement (e.g., having a higher priority), and determine to not transmit the announcement to the smartwatch (e.g., to avoid overwhelming the user with notifications). In some embodiments, the resident device may identify another resident device that is associated with the recipient user account for receiving the announcement. For example, the first message may indicate a particular zone (e.g., a room within the home) for transmitting the device. In this example, the resident device may identify a smart speaker device in a bedroom of the recipient user for transmitting the announcement. As described herein, it should be understood that any suitable selection and/or combination of recipient devices may be identified for receiving the announcement and/or notification.

At block 710, the resident device may transmit a second message to the particular user device for presentation of the announcement by the particular user device. In some embodiments, one or more of the operations of block 710 may be similar to one or more operations described in reference to block 608.

Figure 8:
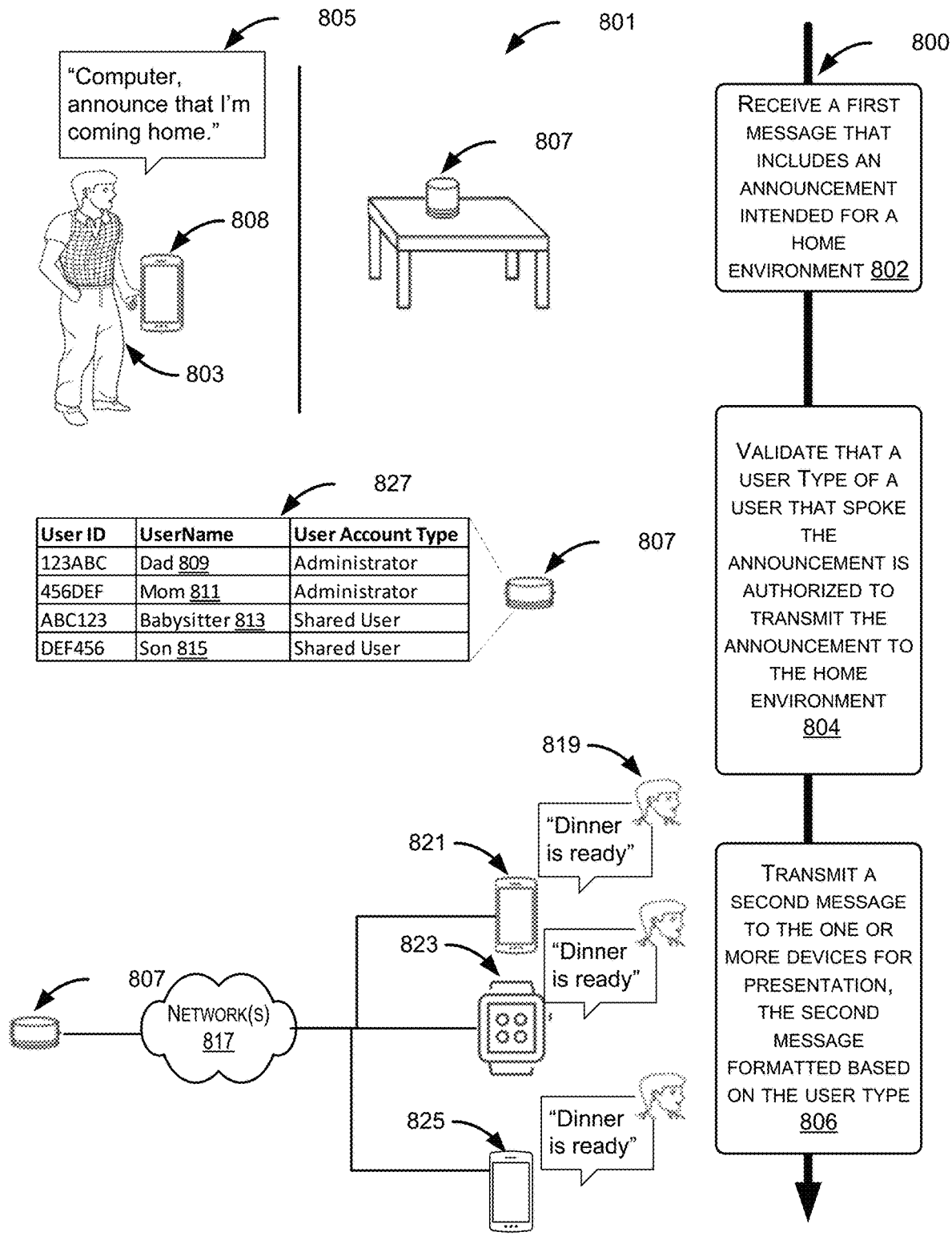

FIG. 8 is another simplified flow diagram illustrating an example process for transmitting a message to one or more devices, according to some embodiments. The process 800 is an example high-level process for a system (e.g., resident device 807, which may be similar to resident device 108 of FIG. 1) that may transmit (e.g., relay) a message including an announcement to one or more devices for presentation of the announcement. Similar to as described in reference to FIG. 2, the process may be performed within the context of a home environment (and/or devices affiliated with the home environment), which may be similar to the home environment 101 of FIG. 1. The diagram 801 depicts example states that correspond to blocks of the process 800. The diagram 801 may include elements that are similar to those depicted in reference to FIG. 1. For example, a user 803 may be similar to the user 114 of FIG. 1 (e.g., outside the home environment), user device 808 may be similar to user device 124, user device 821 may be similar to user device 120 of FIG. 1, and user device 823 may be similar to user device 122. In this example, user device 825 may correspond to another user device that is outside the home environment. Also, network(s) 817 may include a LAN associated with the home environment. The network 817 may also include a WAN (e.g., the Internet).

Turning to the process 800 in further detail, at block 802, the system (e.g., resident device 807) may receive a first message that includes an announcement intended for a home environment. For example, similar to as described herein, the announcement may be associated with a voice that spoke the announcement. Using diagram 801 for illustration, the user 803 (e.g., dad) may wish to announce to other members of home environment that dinner is ready. The user 803 speaks a voice message 805, "Computer, announce that I'm coming home." The user device 808 may receive the voice message 805 as input, for example, via a microphone attached to the user device 808, and then record and/or process the voice message 805. In one example, the user device 808 may then analyze the voice message 805 (e.g., including performing NLP and/or other suitable voice recording processing operations) and then transmit the first message that contains the processed voice message 805 to the system (e.g., resident device 807), whereby the system may then analyze the recorded message to determine (e.g., obtain) the announcement. In this example, the user device 808 transmits the message from outside the home environment. Accordingly, in one example, the first message from the user device 808 may be transmitted over a WAN to the resident device 807 via a server device (e.g., server device 508 of FIG. 5), which may relay the first message to the resident device 807 that is located within (e.g., connected to) the LAN associated with the home environment.

At block 804, the system may validate that a user type of a user that spoke the announcement is authorized to transmit the announcement to the home environment. For example, continuing with diagram 801 for illustration, upon receiving the first message, the resident device 807 may analyze the first message to determine one or more elements. This may include, for example, determining a device identifier of the user device 808 that originally sent the message, determining a location of user device 808 (e.g., outside the home environment), determining an associated sender user type of the user account (e.g., of an application executing on the user device 808) that transmitted the announcement, determining (e.g., confirming) a sender user identity based on performing NLP on the voice message 805 (e.g., obtained from the first message), etc. The resident device 807 may then utilize the one or more elements to validate that the user type of the user (e.g., user 803) that spoke the announcement is authorized to use the resident device 807 to relay the announcement to other devices of the home environment.

In some embodiments, the resident device 807 may perform the validation by retrieving a user account information associated with one or more user accounts (e.g., associated with the home environment) from table 827. For example, the table 827 may indicate that the username 809 for dad's account is "Dad," the user identifier is "123ABC," and the user account type (e.g., user type) is "Administrator." Similarly, username 811 for mom's account may be "mom," with a user type of "Administrator," username 813 for the babysitter's account may be "babysitter," with a user type of "Shared User," and similarly for username 815 for the son's account, which may be a user type of "Shared User." Continuing with the illustration, the resident device 807 may determine (e.g., based on performing NLP on the voice message 805 and/or metadata from the first message) that the announcement is from dad, and thus associated with dad's account of type "Administrator." In this example, the resident device 807 may determine that that the user account type "Administrator" is authorized to transmit an announcement from outside the home environment (e.g., over a WAN) to other devices of the home environment. The "Shared User" type, in this example, may not be authorized to transmit an announcement to the home environment from outside the home environment, but may be enabled to do so when within the home environment (e.g., connected to the LAN). Accordingly, because the announcement is associated with dad's account (e.g., dad's voice and/or dad's device), the resident device 807 may authorize broadcasting the message to other devices of the home environment. In another example, if user 803 was the babysitter (e.g., making the announcement as a shared user from outside the home), the resident device 807 may block the announcement from being broadcasted. In at least this way, techniques may improve upon security when relaying messages to devices of a home environment.

Although, in this example, the validation was performed over a message that arrived from outside the home environment, embodiments are not so limited. For example, in another scenario, suppose that the babysitter transmitted the announcement from within the home environment (e.g., via their mobile phone device). In this example, the resident device 807 may first verify that the babysitter (e.g. with username 813) is a shared user of the home environment, and/or verify that the particular device is registered with the username 813. This may be used to prevent other devices that may be connected to a WiFi of the home, but otherwise not joined to the home environment (e.g., having a registered account), from broadcasting announcements to the home. In this example, upon verifying that the babysitter has a registered account as a shared user and that the device is currently transmitting the announcement from within the home environment, the resident device 807 may successfully validate the babysitter's device is authorized to transmit the announcement to the home environment.

At block 806, the system may transmit a second message to the one or more devices for presentation, the second message being formatted based on the user type. Continuing with the above illustration, upon validating that the user type is authorized to transmit the announcement, the resident device 807 may determine one or more devices associated with the home environment that will receive the announcement. As described herein, the resident device 807 may utilize any suitable method to determine which user types, user accounts, and/or devices will receive the announcement. For example, the resident device 807 may determine that a particular user type (e.g., "Administrator") will receive the announcement. In another example, the resident device 807 may determine that a subset of user accounts affiliated with the home environment (e.g., and/or associated devices of the subset of user accounts) will receive the message. In another example, the resident device 807 may determine that only those devices currently located within the home environment (e.g., having user accounts registered with the home environment and/or presently be connected to a LAN of the home environment) will receive the message. In this example, the resident device 807 determines that user device 821 and user device 823, both located within the home environment (e.g., associated within user 112 of FIG. 1) will receive the second message (e.g., via the LAN), while user device 825 (e.g., located outside the home environment over a WAN) will not. In another example, both devices within and outside the home environment (e.g., including user device 821, user device 823, and user device 825) will receive the second message.

In some embodiments, the resident device 807 then generates the second message that is formatted based on the user type of the sender account. For example, using the earlier example, in which dad is announcing that he is coming home, the resident device 807 may generate the second message formatted based on determining that an "Administrator" user type is transmitting the announcement. In some embodiments, the formatting may be associated with when and/or how the message is processed by a recipient device. For example, in some embodiments, the formatting may indicate whether PII associated with the sender user account is included and/or presented by the recipient user device. In this case, the resident device 807 may determine that, because the user type is "Administrator," PII (e.g., dad's name, image, avatar, etc.), may be included within the second message and/or presented by the recipient device via a display (e.g., as described in reference to FIG. 3). In FIG. 8, this is depicted whereby, in addition to each user device displaying "I'm coming home," the respective user device may also display an image 819 of dad. In another example, where the sender may be a "Shared User" type (e.g., the babysitter), the resident device 807 may determine to omit PII associated with the voice that spoke the announcement (e.g., the sender). It should be understood that the second message may be formatting in any suitable way and/or include rules that may be used to determine how and/or when a message is presented on a particular device. In some embodiments, the formatting may associated with, for example, privacy controls, instructions for what elements to present on a display of the user device, rules (e.g., conditions) for displaying or suppressing the announcement, etc.

Figure 9:
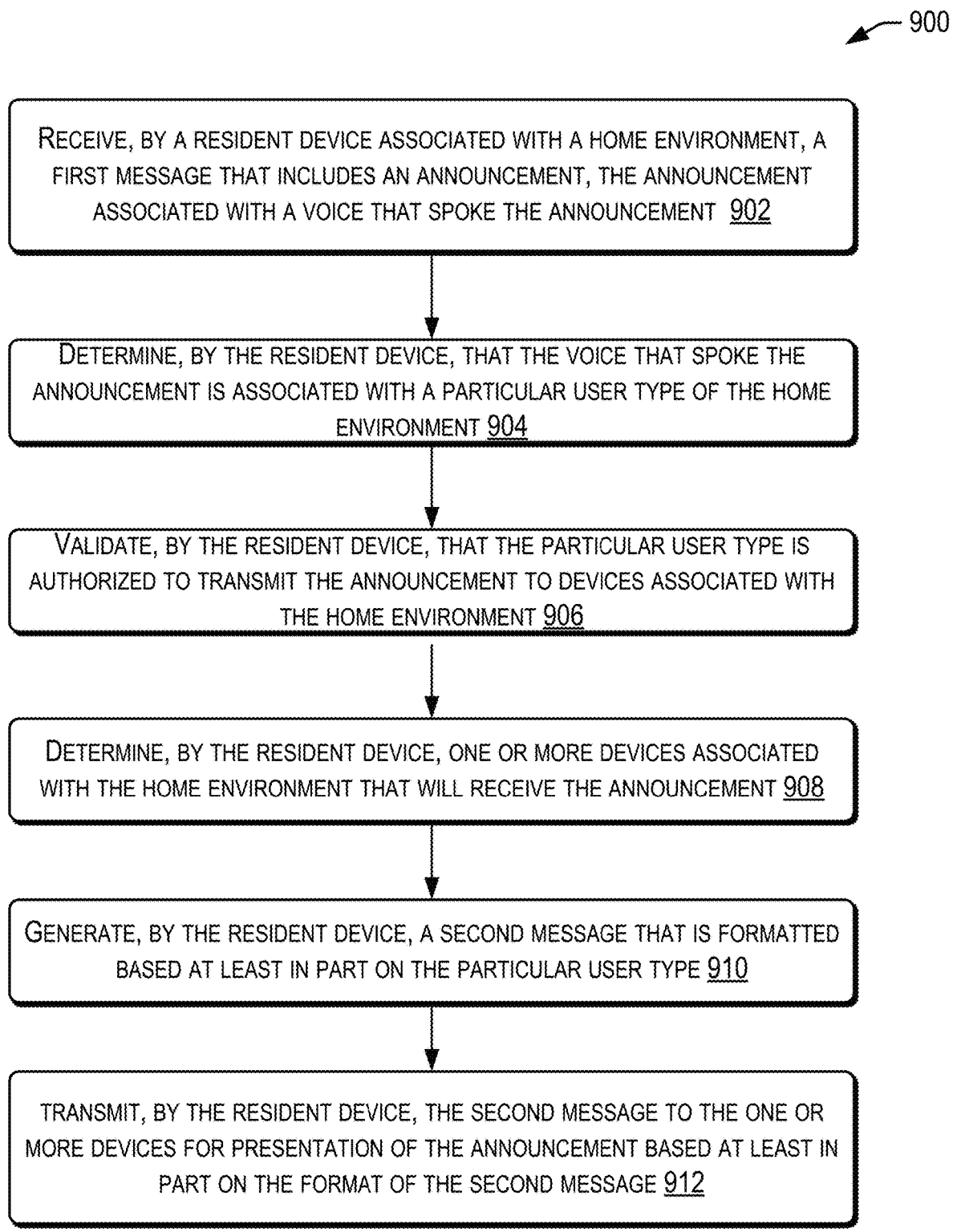

FIG. 9 is another simplified flow diagram illustrating an example process for transmitting a message to one or more devices, according to some embodiments. In the process 900 of FIG. 9, a resident device may validate that a particular user type is authorized to transmit an announcement, utilizing the resident device as a relay device to other devices of a home environment. The announcement may be formatted based in part on the particular user type (e.g., including or excluding PII of the sender account).

At block 902, a resident device that is associated with a home environment receives a first message that includes an announcement, the announcement being associated with a voice that spoke the announcement. In some embodiments, one or more operations of block 902 may be similar to as described in reference to block 802 of FIG. 8. For example, the resident device may obtain a voice recording from the first message that includes the announcement. The first message may have been transmitted from any suitable device (e.g., a user device or resident device). Also, the first message may have originated from any suitable location, for example, outside the home environment (e.g., via a WAN) or from within the home environment (e.g., via a LAN associated with the home environment).

At block 904, the resident device determines that the voice that spoke the announcement is associated with a particular user type of the home environment. In some embodiments, one or more operations of block 904 may be similar to as described in reference to block 804 of FIG. 8. For example, the particular user type (e.g., user account type) may be one of a plurality of user types associated with the home environment. This may include, for example, an administrator type and/or a shared user type. The resident device may analyze the first message including the announcement (e.g., the voice recording) to obtain any suitable information, for example, including identity information for the user that voiced the announcement. Based on this information, the resident device may determine the particular user type associated with the identity of the person. For example, using an earlier illustration, in case where the resident device determines that "dad" voiced the announcement, the resident device may further determine that dad is associated with an administrator type of the home environment. It should be understood that the particular user type of the sender user account and/or the identity of the sender user account may subsequently be used to determine instructions for relaying the announcement.

At block 906, the resident device validates that the particular user type is authorized to transmit the announcement to devices associated with the home environment. In some embodiments, one or more operations of block 906 may also be similar to as described in reference to block 804 of FIG. 8. In some embodiments, the resident device may also perform the validation based in part on a determined location of the sender device. Using the illustration above, suppose that dad is outside the home environment. The resident device may determine that, because dad is associated with an administrator type of account, dad may be authorized to send an announcement to other devices of the home environment. In another example, if the babysitter (e.g., a shared user type) were to attempt to send an announcement while located outside the home environment, the resident device may prevent (e.g., block) the message from being relayed to other devices. In some embodiments, the resident device may perform the validation based in part on determining that the voice of the sender is associated with a particular user account of the home environment (e.g., dad's user account, mom's user account, etc.). Techniques described herein may perform any suitable procedure and/or combination of procedures (e.g., rule verification) to perform validation when relaying a message (e.g., based on time of day, device location, etc.). In some embodiments, this validation may improve security and/or privacy associated with the home environment and/or associated devices. For example, devices may not receive unwanted announcements.

At block 908, the resident device determines one or more devices associated with the home environment that will receive the announcement. In some embodiments, one or more operations of block 906 may be similar to as described in reference to block 806 of FIG. 8. For example, in one embodiment, the resident device may determine one or more recipient user accounts based on the particular sender user type. For example, suppose that the sender corresponds to the babysitter's user account, which is associated with a shared user type (e.g., as depicted in FIG. 8). In this example, the resident device may determine that the recipient user accounts will be administrators (e.g., mom's account and dad's account, as depicted in table 827). The resident device may then determine one or more devices associated with the respective recipient user accounts. In some embodiments, the resident device may determine the one or more devices based on the identity of the sender user account. For example, the resident device may determine that messages from the babysitter user account (e.g., a shared user type) may be relayed to one set of user accounts (and/or devices), while messages from the housekeeper's user account (e.g., also a shared user type) may be routed to a different set of user accounts (and/or devices).

At block 910, the resident device generates a second message that is formatted based at least in part on the particular user type. In some embodiments, one or more operations of block 906 may also be similar to as described in reference to block 806 of FIG. 8. For example, in some embodiments, the resident device may include or omit personal identifiable information associated with the voice that voiced (e.g., spoke) the announcement, based in part on the particular user type (e.g., shared user, administrator, etc.) of the user account of the person that voiced the announcement. As described herein, this may enhance privacy controls based on the user account and/or user type that is sending the message. In some embodiments, the format of the second message may include any suitable information, for example, rules for presenting the announcement, information regarding the sender device and/or the sending zone, etc.

At block 912, the resident device transmits the second message to the one or more devices for presentation of the announcement based at least in part on the format of the second message. In some embodiments, one or more operations of block 912 may also be similar to as described in reference to block 806 of FIG. 8 and/or block 206 of FIG. 2. For example, suppose that the format of the second message includes PII of the user account of the user that voiced the announcement. In this example, the recipient device may present the PII of the user account (e.g., an image or avatar of the user) based on this format of the second message.

Figure 10:
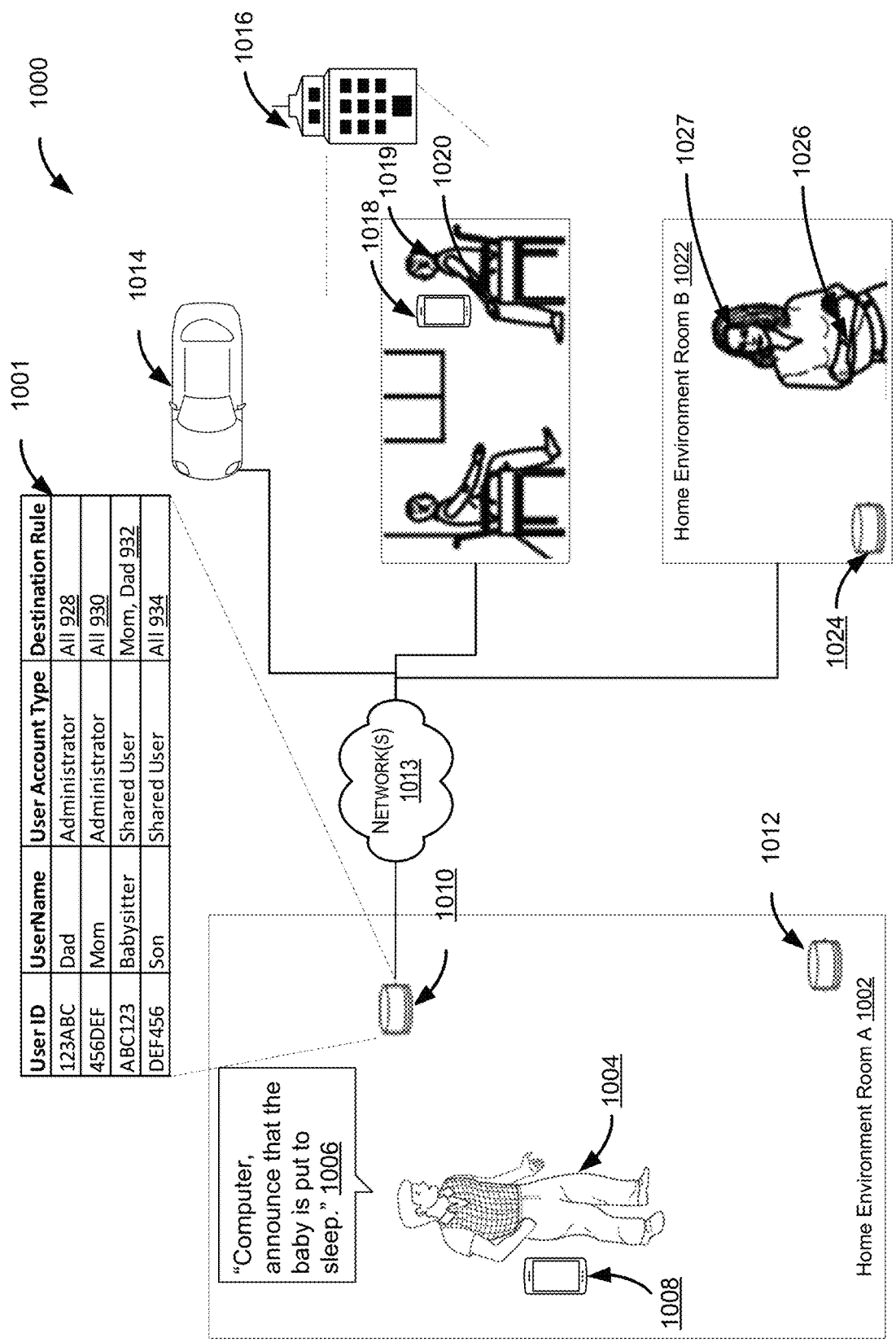

FIG. 10 is another block diagram illustrating example techniques for transmitting a message to one or more devices, according to some embodiments. In diagram 1000, several elements are depicted. For example, home environment room A 1002 and home environment room B 1022 may be rooms within the same home environment (e.g., similar to home environment 101 of FIG. 1). Within home environment room A 1002 may be a user 1004. The user 1004 (e.g., a babysitter) may be associated with a user device 1008 (e.g., a mobile phone), whereby the user device 1008 and/or the user account of the babysitter is registered with the home environment. It should be understood that any one or more of the devices (e.g., user devices and/or resident devices) described within FIG. 10 may be associated (e.g., registered) with the home environment (e.g., via association with a particular user account and/or with the home environment). The home environment room A 1002 may include a resident device 1010, which may be closer in proximity to user 1004 than a resident device 1012 (also located in the home environment room A 1002). The resident device 1010 (and/or another other suitable resident device of the home, capable of operating as a relaying hub device) maintains a table 1001. The table 1001 may include information associated with user accounts and/or user devices associated (e.g., registered) with the home environment. For example, the table 1001 may indicate that the user identifier for the babysitter's account is "ABC123," and that the babysitter account is a shared user type. As described further herein, the table 1001 may be used by the resident device 1010 to determine how to relay messages among user accounts and/or associated devices of the home environment.

Within home environment room B 1022 may include user 1027 (e.g., mom). User 1027 may be associated with user ID "456DEF" in table 1001, whereby the user account is an administrator type. User 1027 may be associated with user device 1026 (e.g., a smartwatch) that is associated with mom's user account registered with the home environment. The home environment room B 1022 may also include a resident device 1024, also registered with the home environment.

A workplace facility 1016 is also depicted in diagram 1000, which is outside the home environment. The workplace facility includes a room that depicts user 1019 (e.g., dad) holding a meeting with another individual. User 1019 may be carrying a user device 1018 (e.g., a mobile phone) on his person with him, and may also be wearing a smartwatch (e.g., user device 1020).

Additionally, a vehicle 1014 is depicted in diagram 1000. The vehicle may be also be outside the home environment, and may be in transit to another destination (e.g., home, or another location). The vehicle 1014 may include a computing device that is registered as a device associated with mom and dad's son. The son (e.g., with user ID "DEF456") may be registered as a shared user type.

In some embodiments, the devices associated with the home environment may be communicatively connected via network(s) 1013. As described herein, network 1013 may include any suitable one or more sub-networks (e.g., a LAN associated with the home environment and/or a WAN (e.g., the Internet)). For example, a message communicated by user device 1008 to resident device 1024 (e.g., both located within the home environment) may be communicated over the LAN, while another message communicated by user device 1008 to vehicle 1014 may be communicated via both the LAN and the WAN. For example, the message may be communicated by the user device 1008 to the resident device 1010, then the resident device 1010 may relay the message over the Internet to the vehicle 1014. In some embodiments, the resident device 1010 may determine whether to relay a message based in part on determining a particular network path from which the originating message was received (e.g., via the LAN of the home environment, or via the Internet).

Turning to the example techniques of diagram 1000 in further detail, consider a scenario in which the user 1004 (e.g., the babysitter) voices to resident device 1010 a message 1006, "Computer, announce that the baby is put to sleep." In this scenario, the resident device 1010 may determine how to process the message based on one or more rules.

In some embodiments, the resident device 1010 may include rules that determine how to process a message based on the sender's user type. For example, one rule may instruct that a message from a shared user type will go to only administrator user account types. In the example of diagram 1000, whereby the babysitter account is a shared user type, the message 1006 may be transmitted to one or more devices associated with mom and dad (e.g., both administrator accounts).

In some embodiments, the resident device 1010 may include rules that determine how to process a message based on an identifier of the sender's user account. For example, table 1001 may indicate a destination rule 932 that messages sent from user ID "ABC 123" (e.g., the babysitter's account) will be automatically routed to mom and dad's accounts (e.g., devices associated with mom and dad's accounts). In another example, destination rule 928 may indicate that messages sent from dad's account will be routed to all user accounts of the home environment. Similarly, destination rule 930 may route messages from mom to all user accounts, and destination rule 934 may route messages from son to all user accounts. Note that, although in this example, both the son and the babysitter are shared user types, the respective destination rules may be different, depending on the particular user account identifier. Accordingly, in the example above, the message from the babysitter (e.g., user 1004) may be routed to the user accounts of mom and dad, based on the destination rule 932 for the particular sender user identifier.

In another example, the resident device 1010 may determine how to relay a message based in part on a location of a device and/or a type of a recipient user account. For example, suppose a rule may indicate that shared users may transmit (and/or receive announcements) while in the home environment, but may not transmit (or receive announcements) while outside the home environment. In the example above, user 1004 (e.g., a shared user type) may be validated to transmit the announcement of message 1006 at least in part upon verification that they message was sent from the home environment (e.g., with resident device 1010 receiving the message). Also, both mom and dad's accounts (e.g., administrators) may receive the relayed message. In another example, where user 1004 is the son, and the vehicle 1014 is associated with the babysitter, although the destination rule 934 may indicate that the message may be relayed to all user accounts, the resident device 1010 may determine that, because the babysitter account is a shared user type, the resident device 1010 will not relay the message to devices (e.g., vehicle 1014) associated with the babysitter's account as long as the location of the device is outside the home environment (e.g., not connected to the LAN of the home environment).

As described herein, in some embodiments, a recipient device may determine how to process a relayed message based on a verification of one or more conditions. In one non-limiting example, a recipient device may suppress a message upon determining that the device is associated with the same user account of the person that voiced the message. For example, utilizing diagram 1000 for illustration, the resident device 1010 may determine to relay the message 1006 to the user device 1008 of the babysitter. However, the user device 1008 may determine, based on a format of the message (e.g., data indicating an identifier of the sender), to suppress presentation of the announcement of message 1006 based determining that the user device 1008 is associated with the sender. It should be understood that the message may still optionally be received and/or stored by the user device 1008, although a notification of the announcement may not be presented on a display of the user device 1008. In another example, the message may be presented or suppressed by a device, depending on a proximity of the device to another device that is also associated with the home environment. For example, the resident device 1012 may determine that, because it is in close proximity (e.g., the same room) to resident device 1010 and/or user device 1008, it will suppress (e.g., not present) the announcement on a speaker of the resident device 1012, even though it may still receive and/or store the message 1006 from resident device 1010. In some embodiments, the resident device 1012 may determine to present the message, for example, if the determined distance between devices is greater than a predefined threshold distance. In some embodiments, a device that receives (e.g., records) the message from the sender (e.g., in this case, resident device 1010) may also suppress presentation of the announcement. Consider another case in which both resident device 1010 and resident device 1012 receive an announcement (e.g., from resident device 1024). In this case, depending on the configuration of the resident devices in the same room (e.g., home environment room A 1002), the devices may synchronize presentation of the audio of the message (e.g., presenting a stereo playback on speakers of the resident devices).

In some embodiments, a recipient device associated with another recipient user account (e.g., other than the sender's user account) may determine to present or suppress a message depending one or more other conditions. For example, as described herein, a recipient device may determine whether to present a message based on proximity to another one or more devices. Using diagram 100 for illustration, both the resident device 1024 and the user device 1026 (e.g., a smartwatch associated with mom's user account) may receive message 1006. In one example, however, the user device 1026 may determine to suppress presentation of the message when it determines that a resident device is nearby. Accordingly, the resident device 1024 may present message 1006 via a speaker of the resident device, while the smartwatch may suppress the message. It should be understood that any suitable arrangement of presentation and/or suppression of messages may be performed by each device. For example, in another scenario, the smartwatch may present a pop-up notification on the display of the watch, but may not cause the watch to vibrate upon receiving the message.

In some embodiments, a device may determine whether to suppress a message based on a condition corresponding to detection of a particular type of activity presently associated with a recipient user account. For example, as depicted in diagram 1000, user 1019 (e.g., dad) may be presently engaged in a meeting. In one example, user device 1018 and user device 1020 may both have access to a dad's electronic calendar, and may determine that a meeting is in progress. Accordingly both devices may suppress presentation of the message (and/or a notification of the message) on respective displays of each device. In another example, a combination of conditions and/or rules may be utilized to determine when and/or how to present a message. For example, both user device 1018 and user device 1020 may be in close proximity to one another. In this example, the smartwatch (e.g., user device 1020) may have higher priority to display the message 1006 when in close proximity to a mobile device (e.g., user device 1018). Accordingly, when the meeting is completed, the smartwatch may display a notification of the message 1006, while the mobile device may store the message but not present any notification. It should be understood that any suitable rules and/or conditions may be utilized to determine how and when to present or suppress messages. For example, the resident device 1010 and/or individual user devices may store user preferences associated with presentation of messages and/or notification of messages. One example user preference may be to not present any notifications during a certain time range (e.g., while the user is sleeping), which may correspond to a "Do-Not-Disturb" period of time. In at least these ways, techniques may provide a better user experience that provides timely alerts to users of announcements of a home environment, while not overwhelming a user with too many messages on one or more devices.

FIG. 11 is another simplified flow diagram illustrating an example process for transmitting a message to one or more devices, according to some embodiments.

At block 1102, a resident device that is associated with a home environment receives a first message that includes an announcement, the announcement associated with a voice that spoke the announcement. In some embodiments, one or more operations of block 1102 may be similar to as described in reference to block 902 of FIG. 9.

At block 1104, the resident device determines that the voice that spoke the announcement is associated with a particular user account of a particular user type of the home environment. In some embodiments, one or more operations of block 1104 may be similar to as described in reference to block 904 of FIG. 9.

At block 1106, the resident device determines one or more recipient user accounts for receiving the announcement based on the particular user account or the particular user type. For example, as described in reference to FIG. 10, the resident device may determine that messages transmitted from user devices (e.g., from an application executing on the user device) associated with a shared user type may be intended for a subset of user account types (e.g., only administrator types), and/or a subset of user accounts (e.g., user account identifiers for "mom" and "dad").

At block 1108, the resident device determines one or more devices associated with the home environment that will receive the message. In some embodiments, a device of the one or more devices is selected for receiving the message based on a location of the device or a type of the respective recipient user account of the one or more recipient user accounts. In some embodiments, one or more operations of block 1108 may be similar to as described in reference to FIG. 10. For example, a device associated with a shared user type may be excluded from receiving the message if it is determine that the present location of the device is outside the home environment (e.g., not available via the home LAN). It should be understood that any suitable method may be utilized to determine recipient devices. For example, in some embodiments, only resident devices of the home may receive the announcement. In another example, only user devices with a certain hardware configuration may receive the announcement. In yet another example, only devices located within a particular one or more zones of the home may receive the announcement.

At block 1110, the resident device transmits a second message to the one or more devices for presentation of the announcement, wherein the device of the one or more devices presents the second message based on a verification of one or more conditions. In some embodiments, one or more operations of block 1110 may be similar to as described in reference to FIG. 10. The one or more conditions may correspond to any suitable conditions, including, for example, a present location of a user device (e.g., within or outside the home environment), a proximate location to other user devices (and/or resident devices), a time of day, a present activity associated with the user account of the user device, a user preference stored on the user device, etc.

Other preferred and non-limiting embodiments or aspects will be set forth in the following numbered clauses:

Clause 1: A method, comprising: receiving, by a resident device, a first message that includes an announcement, the announcement associated with a voice that spoke the announcement, the first message indicating a recipient user account for receiving the announcement; obtaining, by the resident device, the announcement from the first message; obtaining, by the resident device, the recipient user account associated with the first message, the recipient user account associated with one or more devices; identifying, by the resident device, a particular user device of the one or more devices associated with the recipient user account; and transmitting, by the resident device, a second message to the particular user device for presentation of the announcement on the particular user device.

Clause 2: The method of clause 1, further comprising: detecting, by the resident device, that a second user device of the one or more devices associated with the recipient user account is proximate to the particular user device; and selecting, by the resident device, the particular user device for presentation of the announcement instead of the second user device based at least in part on respective locations of the particular user device and the second user device with respect to a user corresponding to the recipient user account.

Clause 3: The method of any one of clauses 1-2, wherein the particular user device and the resident device are located within a home environment, and wherein the second message is transmitted to the particular user device over a local area network associated with the home environment.

Clause 4: The method of any one of clauses 1-3, wherein the resident device is located in a home environment and the particular user device is located outside the home environment, and wherein the second message is transmitted to the particular user device via a server device that is outside the home environment.

Clause 5: The method of any one of clauses 1-4, wherein the resident device is located within a home environment that includes one or more zones, a user associated with the particular user device determined to be in a particular zone of the home environment, and wherein the second message is transmitted to the particular user device based at least in part on being located within the particular zone.

Clause 6: The method of any one of clauses 1-5, wherein the second user device is also located within the particular zone of the home environment.

Clause 7: A method, comprising: receiving, by a resident device associated with a home environment, a first message that includes an announcement, the announcement associated with a voice that spoke the announcement; determining, by the resident device, that the voice that spoke the announcement is associated with a particular user type of the home environment; validating, by the resident device, that the particular user type is authorized to transmit the announcement to devices associated with the home environment; determining, by the resident device, one or more devices associated with the home environment that will receive the announcement; generating, by the resident device, a second message that is formatted based at least in part on the particular user type; and transmitting, by the resident device, the second message to the one or more devices for presentation of the announcement based at least in part on the format of the second message.

Clause 8: The method of clause 7, wherein the particular user type is one of a plurality of user types associated with the home environment, the plurality of user types including at least one of: (I) an administrator type, or (II) a shared user type.

Clause 9: The method of any one of clauses 7-8, wherein the first message is received from a user device that does not have access to address data respectively associated with the one or more devices.

Clause 10: The method of any one of clauses 7-9, wherein the first message is received from a user device that is located outside the home environment and associated with the particular user type, and wherein the particular user type and/or the user device is authorized to transmit announcements to the one or more devices from outside the home environment.

Clause 11: The method of any one of clauses 7-10, wherein a user device of the one or more devices is located outside the home environment, and wherein the user device is associated with a second particular user type that is authorized to receive messages while located outside the home environment.

Clause 12: The method of any one of clauses 7-11, wherein the particular user type corresponds to a shared user type, and wherein the second message is formatted to omit personal identifiable information (PII) associated with the voice that spoke the announcement.

Clause 13: The method of any one of clauses 7-12, wherein the particular user type corresponds to an administrator type, and wherein the second message is formatted to include personal identifiable information (PII) associated with the voice that spoke the announcement.

Clause 14: The method of any one of clauses 7-13, wherein the resident device is located within a first room of the home environment, and wherein a second resident device of the home environment suppresses presentation of the announcement based at least in part on also being located within the first room.

Clause 15: The method of any one of clauses 7-14, wherein the announcement is spoken into the resident device, and wherein the resident device suppresses presentation of the announcement via the resident device.

Clause 16: The method of any one of clauses 7-15, wherein the voice that spoke the announcement is associated with a particular user account of the particular user type, wherein the particular user account is associated with a plurality of user devices, and wherein the plurality of user devices respectively suppress presentation of the announcement.

Clause 17: The method of any one of clauses 7-16, further comprising: determining, by the resident device, one or more recipient user accounts respectively associated with the home environment based at least in part on the particular user type, wherein a device of the one or more devices is associated with one of the one or more recipient user accounts.

Clause 18: The method of clause 17, further comprising: determining, by the resident device, a sender user account of the particular user type, the sender user account being associated with the voice that spoke the announcement; and determining, by the resident device, the one or more recipient user accounts based at least in part on the sender user account.

Clause 19: The method of any one of clauses 7-18, wherein determining the one or more devices further comprises: determining, by the resident device, a recipient user account associated with the home environment; determining, by the resident device, a user device associated with the recipient user account; and determining, by the resident device, that the user device and the particular user account are authorized to receive the announcement based at least in part on at least one of: (I) a location of the user device, or (II) a type of the recipient user account.

Clause 20: The method of clause 19 wherein the user device suppresses presentation of the announcement based at least in part on determining that a second device is proximate to the user device.

Clause 21: The method of clause 20, wherein the second device corresponds to another resident device or another user device associated with the recipient user account.

Clause 22: The method of clause 19, wherein the user device presents the announcement based at least in part on detecting a particular type of activity presently associated with the recipient user account.

Clause 23: The method of clause 19, wherein the user device suppresses the announcement until a later time based at least in part on detecting a particular type of activity presently associated with the recipient user account.

Clause 24: The method of any one of clauses 7-23, wherein one of the one or more devices is associated with a particular zone of the home environment, and wherein the particular zone is selected by the resident device for receiving the second message based at least in part on at least one of: (I) the particular user type, or (II) a sender user account associated with the voice that spoke the announcement.

Clause 25: The method of any one of clauses 7-24, further comprising: receiving, by the resident device, a response message from one of the one or more devices, wherein at least one device, associated with the voice that spoke the announcement, is proximate to the resident device and also associated with the home environment; and presenting, by the resident device, the response message, wherein the at least one device suppresses presentation of the response message.

Clause 26: The method of any one of clauses 7-25, wherein the resident device is further associated with a local area network (LAN) associated with the home environment, and wherein determining a device of the one or more devices further comprises determining that the device is at least one of: (I) connected to the local area network, or (II) authorized to receive the announcement when not connected to the local area network.

Clause 27: The method of any one of clauses 7-26, wherein the first message is received from a user device located outside the local area network, the user device associated with the particular user type, and wherein validating the particular user type further comprising determining that the particular user type is authorized to transmit the announcement to devices associated with the home environment when located outside the local area network.

Other embodiments of the disclosure may be directed to a computer system comprising: a memory that stores computer-executable instructions; and one or more processors configured to access the memory and execute the computer-executable instructions to implement the method of any one of clauses 1-27.

Other embodiments of the disclosure may be directed to a computer-readable medium storing computer-executable instructions for controlling one or more processors to perform the method of any one of clauses 1-27.

Illustrative techniques for transmitting a message that includes an announcement to one or more devices for presentation of the announcement are described above. Some or all of these techniques may, but need not, be implemented at least partially by architectures such as those shown at least in FIGS. 1-11 above. While many of the embodiments are described above with reference to server devices, controller devices (e.g., resident devices), and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data (e.g., user profiles, user device information). The present disclosure contemplates that in some instances, this gathered data may include personally identifiable information (PII) data that uniquely identifies or can be used to contact or locate a specific person. Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to transmit a message including an announcement to a particular user device of an associated user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving, by a first device, a first message that includes an audio file, the audio file including an announcement, the announcement associated with a voice that spoke the announcement;
   determining, by the first device, the announcement from first message by at least:
      classifying a portion of the audio file as being the announcement, the portion of the audio file having a start point and an end point within the audio file, and the classification based at least in part on a trigger mechanism that indicates the announcement within the audio file; and
      removing, by the first device, the audio file at the start point and the end point;
   identifying, by the first device, one or more devices for receiving the announcement, the one or more devices associated with the first device, each device of the one or more devices having a particular device type of a plurality of different device types comprising at least a mobile device; and
   transmitting, by the first device, a second message to the one or more devices for presentation of the announcement, respectively, by the one or more devices.

2. The method of claim 1, further comprising:
   maintaining one or more user profiles that are respectively associated with a home environment, the first device also associated with the home environment, a second device of the one or more devices being associated with a particular user profile of the one or more user profiles, and wherein the second device is associated with the first device based at least in part both devices being associated with the home environment.

3. The method of claim 1, wherein the first device corresponds to a server device or a resident device.

4. The method of claim 1, wherein the first device is further associated with a local area network (LAN), the local area network interconnecting devices via at least one of a Bluetooth connection, a Thread connection, a ZigBee connection, an Infrared connection, or a WiFi connection.

5. The method of claim 4, wherein transmitting the second message to the one or more devices comprises transmitting the second message over the local area network.

6. The method of claim 1, wherein at least one device of the one or more devices is a type of mobile device, the at least one device being outside a home environment associated with the first device and reachable via a wide area network (WAN), and wherein transmitting the second message to the at least one device comprises transmitting the second message over the wide area network.

7. The method of claim 1, wherein a form of the presentation of the announcement is based at least in part on a respective particular device type of each device, the form including at least one of a text transcription, an audio announcement, an image, or a video.

8. A first device, comprising:
   a memory configured to store computer-executable instructions; and
   one or more processors in communication with the memory and configured to access the memory and execute the computer-executable instructions to, at least:
      receiving, by a first device, a first message that includes an audio file, the audio file including an announcement, the announcement associated with a voice that spoke the announcement;
      determining, by the first device, the announcement from first message by at least:
         classifying a portion of the audio file as being the announcement, the portion of the audio file having a start point and an end point within the audio file, and the classification based at least in part on a trigger mechanism that indicates the announcement within the audio file; and
         removing, by the first device, the audio file at the start point and the end point;
      identifying, by the first device, one or more devices for receiving the announcement, the one or more devices associated with the first device, each device of the one or more devices having a particular device type of a plurality of different device types comprising at least a mobile device; and
      transmitting, by the first device, a second message to the one or more devices for presentation of the announcement, respectively, by the one or more devices.

9. The first device of claim 8, wherein the classifying the portion of the audio file as being the announcement further comprises:
transmitting, by the first device, the audio file to a remote server, wherein the remote server is configured to classify the portion of the audio file as being the announcement; and
receiving, by the first device from the remote server, splicing data that includes an indication of the start point and the end point.

10. The first device of claim 8, wherein the announcement is spoken by the voice directly to the first device, the first device being a resident device located within a home environment.

11. The first device of claim 8, wherein the announcement is spoken by the voice into a user device that is associated with the first device, the first device receiving the first message from the user device.

12. The first device of claim 11, wherein the user device is a mobile device that is located outside or inside a home environment associated with the first device.

13. The first device of claim 8, wherein the first device is a resident device of a home environment, and wherein a second device of the one or more devices is also a resident device associated with a zone of the home environment.

14. One or more non-transitory computer-readable storage media comprising computer-executable instructions that, when executed by one or more processors of a first device, cause the one or more processors to perform operations comprising:
receiving, by a first device, a first message that includes an audio file, the audio file including an announcement, the announcement associated with a voice that spoke the announcement;
determining, by the first device, the announcement from first message by at least:
classifying a portion of the audio file as being the announcement, the portion of the audio file having a start point and an end point within the audio file, and the classification based at least in part on a trigger mechanism that indicates the announcement within the audio file; and
removing, by the first device, the audio file at the start point and the end point;
identifying, by the first device, one or more devices for receiving the announcement, the one or more devices associated with the first device, each device of the one or more devices having a particular device type of a plurality of different device types comprising at least a mobile device; and
transmitting, by the first device, a second message to the one or more devices for presentation of the announcement, respectively, by the one or more devices.

15. The one or more non-transitory computer-readable storage media of claim 14, wherein the first device is a resident device of a home environment, and wherein a second device of the one or more devices is also a resident device associated with a zone of the home environment.

16. The one or more non-transitory computer-readable storage media of claim 14, wherein the first device is associated with a home environment, and wherein the one or more devices comprise a subset of devices associated with the home environment, the one or more devices each having been selected for receiving the second message, and the selection indicated within the first message.

17. The one or more non-transitory computer-readable storage media of claim 14, wherein the first device is a resident device, and wherein the computer-executable instructions further comprise:
receiving a third message that includes a second announcement, the third message indicating a recipient user account for receiving the second announcement;
obtaining the second announcement from the third message, the recipient user account associated with a subset of the one or more devices;
identifying a particular user device of the subset of the one or more devices associated with the recipient user account; and
transmitting a fourth message to the particular user device for presentation of the announcement on the particular user device.

18. The one or more non-transitory computer-readable storage media of claim 17, wherein the computer-executable instructions further comprise:
detecting that a second user device of the subset of the one or more devices associated with the recipient user account is proximate to the particular user device; and
selecting the particular user device for presentation of the announcement instead of the second user device based at least in part on respective locations of the particular user device and the second user device with respect to a user corresponding to the recipient user account.

19. The one or more non-transitory computer-readable storage media of claim 17, wherein the particular user device and the resident device are located within a home environment, and wherein the fourth message is transmitted to the particular user device over a local area network associated with the home environment.

* * * * *